United States Patent
Hori et al.

(10) Patent No.: US 12,535,530 B2
(45) Date of Patent: Jan. 27, 2026

(54) IMPEDANCE CALCULATION APPARATUS AND BATTERY MANAGEMENT SYSTEM

(71) Applicant: DENSO CORPORATION, Kariya (JP)

(72) Inventors: Tetsuya Hori, Nisshin (JP); Masaaki Kitagawa, Kariya (JP)

(73) Assignee: DENSO CORPORATION, Kariya (JP)

(*) Notice: Subject to any disclaimer, the term of this patent is extended or adjusted under 35 U.S.C. 154(b) by 168 days.

(21) Appl. No.: 18/375,618

(22) Filed: Oct. 2, 2023

(65) Prior Publication Data
US 2024/0027534 A1    Jan. 25, 2024

Related U.S. Application Data

(63) Continuation of application No. PCT/JP2022/010381, filed on Mar. 9, 2022.

(30) Foreign Application Priority Data

Apr. 2, 2021 (JP) .................. 2021-063473

(51) Int. Cl.
*G01R 31/382* (2019.01)
*G01R 31/389* (2019.01)
*G01R 31/392* (2019.01)

(52) U.S. Cl.
CPC ......... *G01R 31/389* (2019.01); *G01R 31/382* (2019.01); *G01R 31/392* (2019.01)

(58) Field of Classification Search
CPC .............. G01R 31/389; G01R 31/382; G01R 31/392
USPC .............................. 324/430, 500, 600, 76.11
See application file for complete search history.

(56) References Cited

U.S. PATENT DOCUMENTS

| 9,134,382 B2* | 9/2015 | Takahashi | G01R 31/367 |
| 2009/0099802 A1* | 4/2009 | Barsoukov | G01R 31/3648 |
| | | | 702/65 |
| 2010/0084918 A1* | 4/2010 | Fells | H02J 7/00045 |
| | | | 307/32 |
| 2013/0030596 A1* | 1/2013 | Okada | G01R 31/389 |
| | | | 700/297 |
| 2018/0210037 A1* | 7/2018 | Ataka | G01R 27/26 |

(Continued)

FOREIGN PATENT DOCUMENTS

JP    2010-002199 A    1/2010

*Primary Examiner* — Giovanni Astacio-Oquendo
*Assistant Examiner* — Trung Q Nguyen
(74) *Attorney, Agent, or Firm* — Oliff PLC

(57) ABSTRACT

An impedance calculation apparatus applicable to a power source system provided with a storage battery, applying an AC signal to the storage battery to calculate an impedance of the storage battery, during a predetermined impedance calculation period, the impedance calculation apparatus includes: an error calculation unit that applies the AC signal having a specified frequency at which at least either a real part component or an imaginary part component of an impedance of the storage battery is a specific value, to calculate an impedance error of the storage battery, during an error calculation period different from the impedance calculation period; an impedance calculation unit that calculates an impedance of the storage battery during the impedance calculation period; and a correction unit that corrects, based on the impedance error, the impedance of the storage battery calculated by the impedance calculation unit.

14 Claims, 13 Drawing Sheets

(56) References Cited

U.S. PATENT DOCUMENTS

| | | | |
|---|---|---|---|
| 2020/0249281 A1* | 8/2020 | Ishii | G01R 31/367 |
| 2021/0096189 A1* | 4/2021 | Arima | G01R 31/367 |
| 2023/0266398 A1* | 8/2023 | Beauchemin, III | G01R 31/3835 |
| | | | 702/63 |

* cited by examiner

CALCULATION FREQUENCY F0

IMPEDANCE CALCULATION APPARATUS AND BATTERY MANAGEMENT SYSTEM

CROSS REFERENCE TO RELATED APPLICATIONS

This application is the U.S. bypass application of International Application No. PCT/JP2022/010381 filed on Mar. 9, 2022, which designated the U.S. and claims priority to Japanese Patent Application No. 2021-063473 filed on Apr. 2, 2021, the contents of both of these are incorporated herein by reference.

BACKGROUND

Technical Field

The present disclosure relates to an impedance calculation apparatus that calculates an impedance of a storage battery.

Description of the Related Art

Conventionally, as an apparatus for monitoring a storage battery, an apparatus for utilizing an impedance of the storage battery is known. With this apparatus, an AC signal is applied to the storage battery and the impedance of the storage battery is calculated in a state where the AC signal is applied thereto. Then, the state of the storage battery such as a deterioration of the storage battery is monitored based on the calculated impedance.

SUMMARY

A first means of the present disclosure is an impedance calculation apparatus applicable to a power source system provided with a storage battery, applying an AC signal to the storage battery to calculate an impedance of the storage battery, during a predetermined impedance calculation period, the impedance calculation apparatus including: an error calculation unit that applies the AC signal having a specified frequency at which at least either a real part component or an imaginary part component of an impedance of the storage battery is a specific value, to calculate an impedance error of the storage battery, during an error calculation period different from the impedance calculation period; an impedance calculation unit that calculates an impedance of the storage battery during the impedance calculation period; and a correction unit that corrects, based on the impedance error, the impedance of the storage battery calculated by the impedance calculation unit.

BRIEF DESCRIPTION OF THE DRAWINGS

The above-described objects and other objects, features and advantages of the present disclosure will be clarified further by the following detailed description with reference to the accompanying drawings. The drawings are.

DETAILED DESCRIPTION OF THE PREFERRED EMBODIMENTS

Conventionally, as an apparatus for monitoring a storage battery, an apparatus for utilizing an impedance of the storage battery is known. With this apparatus, an AC signal is applied to the storage battery and the impedance of the storage battery is calculated in a state where the AC signal is applied thereto. Then, the state of the storage battery such as a deterioration of the storage battery is monitored based on the calculated impedance.

According to this apparatus, since the AC signal is applied to the storage battery when calculating the impedance of the storage battery, a current flows on a current path along which the AC signal is applied and a magnetic flux is produced. When the magnetic flux produces an induced electromotive force in a voltage response detection circuit including the storage battery, an accuracy for calculating the impedance is lowered. As a technique for preventing the calculation accuracy of the impedance from being lowered due to an induced electro motive force, patent literature, JP-A-2010-2199 discloses a technique of using a four-terminal method is known. According to this technique, when calculating resistance values of the first and second measurement objects, a first conduction path for supplying a first DC current to the first measurement object and a second conduction path for supplying a second DC current to the second measurement object are arranged to be in parallel. Then, the first DC current and the second DC current having mutually opposite polarities and the same amount of current are caused to simultaneously flow through the first and second conduction paths. Thus, magnetic fluxes produced at the first and second measurement objects due to transient states of the first and second DC current can be cancelled and an induced electromotive force can be prevented from being produced on the respective conduction paths.

In the above-described technique, since an arrangement of the conduction paths and the DC current flowing through the conduction paths are significantly restricted, an apparatus which can be used is restricted. Hence, a technique for calculating the impedance of a storage battery is still required to be improved.

First Embodiment

Hereinafter, with reference to the drawings, a first embodiment in which an impedance calculation apparatus according to the present disclosure is applicable to a power source system 10 of a vehicle (e.g. hybrid vehicle or electric vehicle) will be described.

Figure 1:
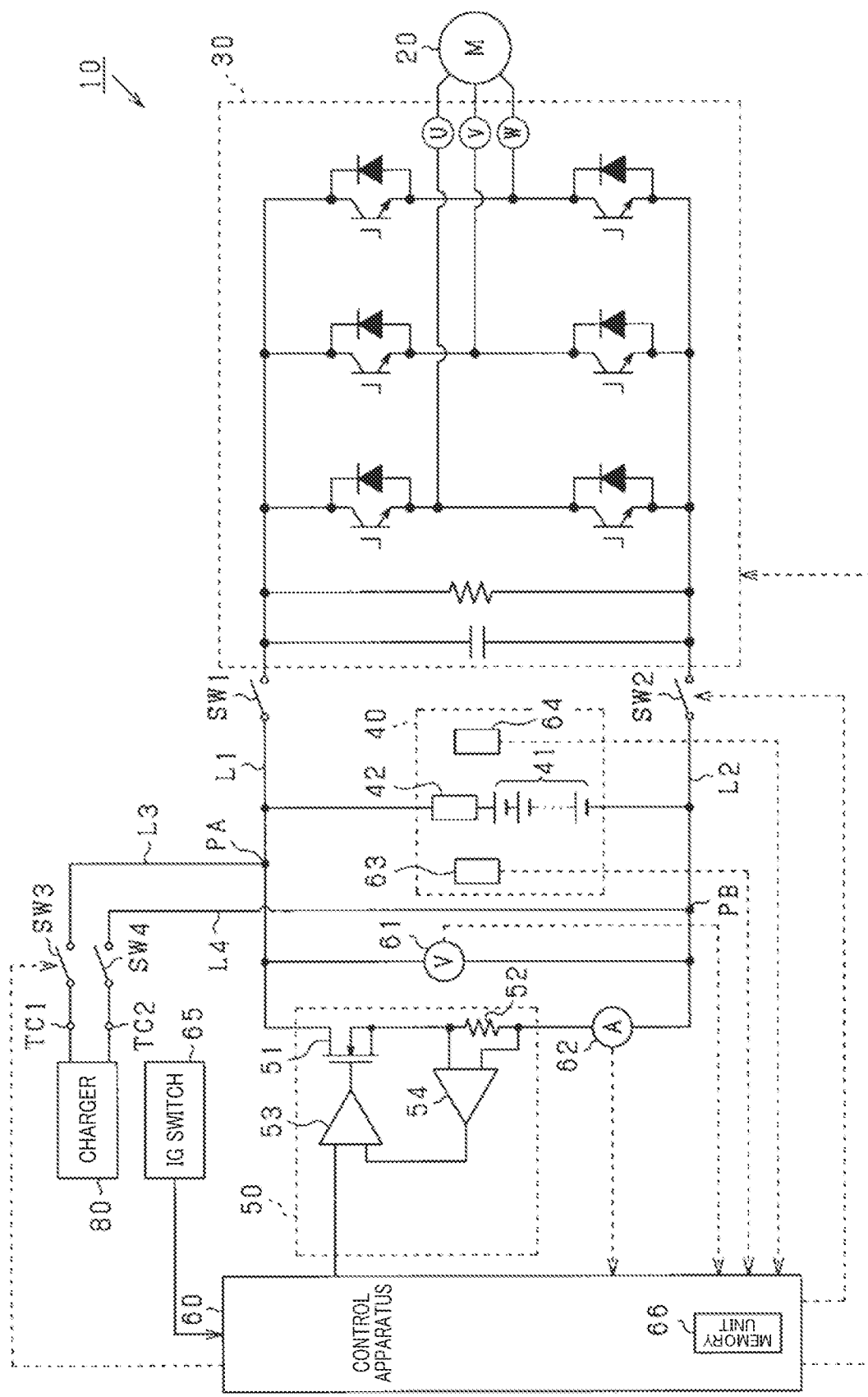
FIG. 1 is a diagram showing an overall confirmation of a power source system according to a first embodiment.

As shown in FIG. 1, the power source system 10 is provided with a motor 20 as a rotary electric machine, an inverter 30, a storage battery 40, a current modulation circuit 50, and a control apparatus 60 as an impedance calculation apparatus.

The motor 20 serves as an on-vehicle main machine and is capable of transmitting power with drive wheels which are not shown. According to the present embodiment, as the motor 30, a three-phase permanent magnet synchronous motor is used.

The inverter 30 includes a full-bridge circuit having upper and lower arm circuits of which the number of phases is the same as that of the phase windings of the motor 20. In the inverter 30, switches (semiconductor switching elements) provided in the respective arms are switched between ON and OFF, whereby current flowing through the respective phase windings is adjusted. The inverter 30 includes a smoothing capacitor and a resistive element connected in parallel to the full-bridge circuit.

Each switch in the inverter 30 is connected to the control apparatus 60. The control apparatus 50 operates respective switching elements based on various detection information of the motor 20 and requirements of the power running operation and a regenerative power generation. Thus, the storage battery 40 exchanges power with the motor 20 via the inverter 30. Specifically, the storage battery 40 discharges when the motor is in power running to supply the power to the motor 20 via the inverter 30. Moreover, the motor 20 produces power with a driving force from the driving wheel when the motor performs a regenerative power generation and supplies power to the storage battery 40 to be charged.

The storage battery 40 is configured as a battery pack in which a plurality of battery cells are connected in series having a terminal voltage of several hundreds of volts. The battery cell is, for example, a lithium-ion battery. The storage battery 40 has a battery cell assembly 41 and an internal resistance 42.

A positive side terminal of an electrical load such as the inverter 30 is connected to a positive side power source path L1 connected to the positive terminal of the storage battery 40. Similarly, a negative side terminal of an electrical load such as the inverter 30 is connected to a negative side power source path L2 connected to the negative terminal of the storage battery 40. At the positive side power source path L1 and the negative side power source path L2 between the storage battery 40 and the electrical load, a first switch SW1 and a second switch SW2 are provided as a system main relay switch. With the first and second switches SW1 and SW2, the electrical load is switched between a conduction state and a cutoff state. Note that the first and second switches SW1 and SW2 correspond to load side switch according to the present embodiment.

The storage battery 40 is configured to be capable of being charged by a charger 80 outside the power source system 10 such as a domestic commercial power source for example.

The storage battery 40 is connected to a first connection terminal TC1 and a second connection terminal TC2 and configured to be capable of being connected to the charger 80 via the first and second connection terminals TC1 and TC2.

The first connection terminal TC1 is connected to the positive electrode side power source path L1 via a positive side charge path L3. In the positive electrode side power source path L1, a connection point PA between the positive electrode side charge path L3 and the positive electrode side power source path L 1 is positioned at a portion closer to the storage battery 40 side than the position of the first switch SW1 is. In the positive electrode side charge path L3, a third switch SW3 is disposed between the first connection terminal TC1 and the connection point PA. Also, the second connection terminal TC1 is connected to the negative electrode side power source path L2 via the negative electrode side path L4. In the negative electrode side power source path L2, a connection point PB between the negative electrode side charge path L4 and the negative electrode side power source path L2 is positioned at a portion closer to the storage battery side than the position of the second switch SW2 is. In the negative electrode side charge path L4, a fourth switch SW4 is disposed between the second connection terminal TC2 and the connection point PB. According to the present embodiment, the third and fourth switched SW3 and SW4 correspond to charger side switch.

The current modulation circuit 50 outputs, with a power source as the storage battery, a predetermined AC signal to the storage battery 40, using the power outputted from the storage battery 40. The Ac signal is a sinusoidal wave, for example. The current modulation circuit 50 includes a semiconductor switching element 51 (e.g. MOSFET) and a resistor 52 connected in series to the semiconductor switching element 51. The drain terminal of the semiconductor switching element 51 is connected to the positive electrode side power source path L1 and the source terminal of the switching element 51 is connected to one end of the resistor 52. The other end of the resistor 52 is connected to the negative side power source path L2. The semiconductor switching element 41 is configured to be capable of adjusting an amount of current between the drain terminal and the source terminal.

Further, the current modulation circuit 50 is provided with a current detection amplifier 54 connected to both ends of the resistor 52. The current detection amplifier 54 detects current flowing through the resistor 52 and outputs the detection value thereof as a feedback signal.

Further, the current modulation circuit 50 is provided with a feedback control circuit 53. The feedback control circuit 53 is configured such that a command signal is transmitted thereto from the control apparatus 60 and a feedback signal is transmitted thereto from the current detection amplifier 54. The feedback control circuit 53 compares the command signal with the feedback signal and outputs the comparison result to the gate terminal of the semiconductor switching element 51.

The semiconductor switching element 51 adjusts, based on the signal from the feedback control circuit 53, the voltage applied between the gate and the source so as to adjust an amount of current flowing between the drain and the source, thereby causing the storage battery 40 to output sinusoidal waves as the AC signal commanded by the command signal. In the case where an error is present between the waveform commanded by the command signal and the waveform of a current flowing through the resistor 52, the semiconductor switching element 51 adjusts an amount of current to correct the error based on the feedback signal from the feedback circuit 53. Thus, the sinusoidal waves of the current flowing through the resistor 52 is stabilized.

The power source system 10 is provided with a voltage sensor 61, a current sensor 62, a temperature sensor 63 and a pressure sensor 64.

The voltage sensor 61 is connected in parallel to the storage battery 40 and detects a variation voltage Vs as a terminal voltage between the positive terminal and the negative terminal of the storage battery 40. When the command signal is not transmitted from the control apparatus 60, the variation voltage Vs equals to the DC voltage of the storage voltage 40. The current sensor 62 is connected in series to a series-connected body composed of the semiconductor switching element 51 and the resistor 52 in the current modulation circuit, and disposed at the negative electrode side power source path L2 side. The current sensor 61 detects a current flowing to the resistor 52 from the storage voltage 40, that is, detects a variation current Im flowing at the storage voltage 40. When the control apparatus 60 detects the feedback signal from the current detection amplifier 54, the variation current Im can be detected from the feedback signal such that the current sensor 62 can be omitted.

The temperature sensor 63 detects the battery temperature TB as the temperature of the storage 40. The pressure sensor 64 detects the pressure to the storage battery 40, specifically a battery pressure PR which is the internal pressure of the storage battery 40. The detection values of the respective sensors 61 to 64 are transmitted to the control apparatus 60.

The control apparatus 60 is provided with a known microcomputer composed of CPU, ROM, RAM, a flash memory and the like. The control apparatus 60 operates with the power supplied from the storage battery 40, and accomplishes various functions for controlling the vehicle referring to programs and control data stored in the ROM. Specifically, the control apparatus 60 controls opened and closed states of the first to fourth switches SW1 to SW. Also, the control apparatus 60 transmits the command signal to the current modulation circuit 50 based on the received detection values, causes the storage battery 40 to output the AC signal and calculates the internal resistance 42 of the storage battery 40.

Figure 2:
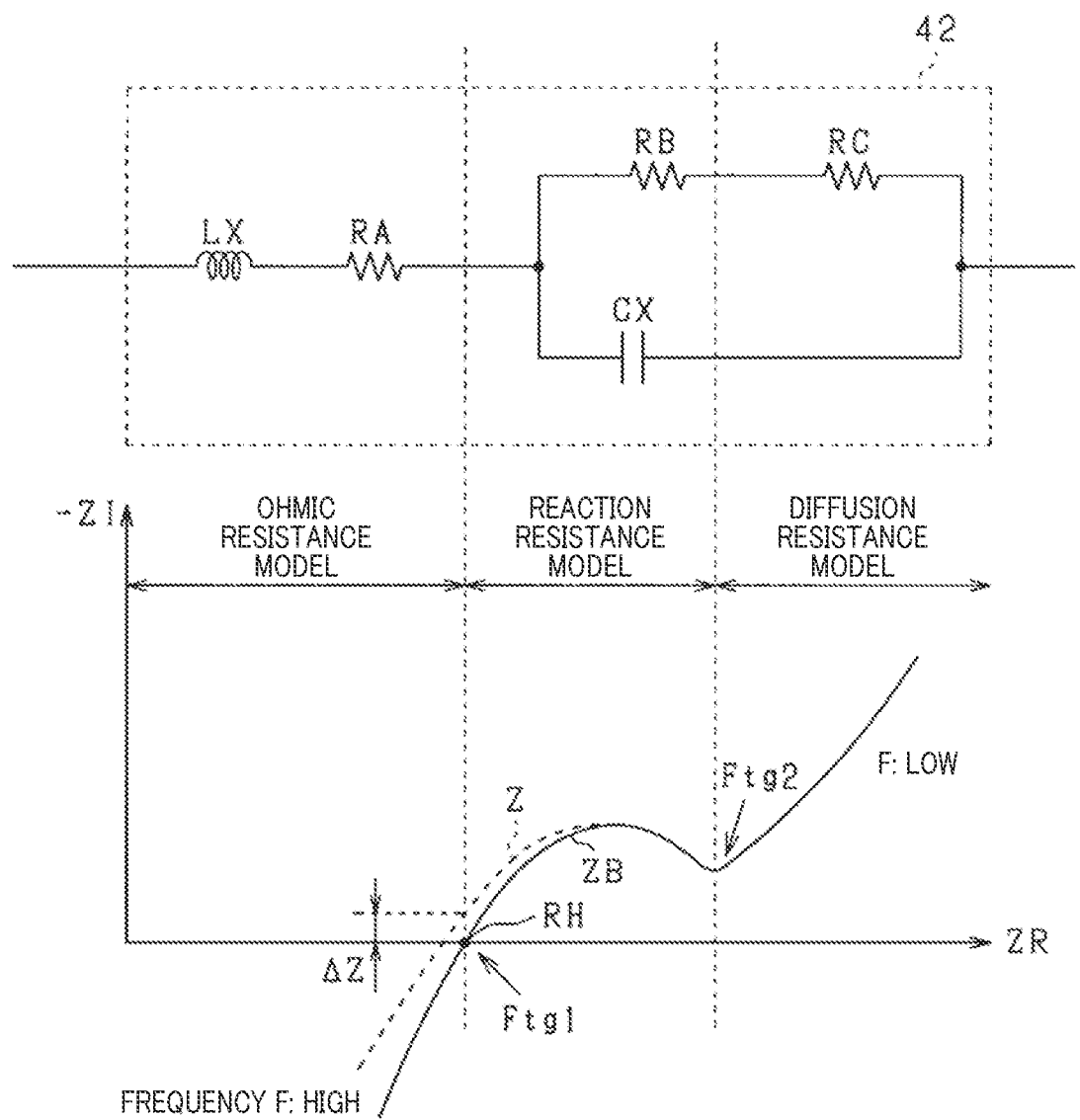
FIG. 2 is a diagram showing an equivalent circuit model of an internal resistance and frequency characteristics of an impedance.

In the upper part of FIG. 2, an equivalent circuit model of the internal resistance 42 of the storage battery 40 is shown. According to the present embodiment, the equivalent circuit model is expressed by a series connected circuit of respective resistance models including an ohmic resistance model, a reaction resistance model and a diffusion resistance model. The ohmic resistance model indicates a conduction resistance in the electrodes and the electrolyte that constitute the storage battery 40. The ohmic resistance model is expressed by a series connected circuit of an inductance component LX and a first resistive component RA. The reaction resistance model indicates a resistance due to an electrode boundary reaction at the electrodes and expressed by a parallel connected circuit of a second resistive component RB and a capacitive component CX. The diffusion resistance model indicates a resistance accompanied with a diffusion of lithium-ion inside the electrode active material coated on the electrode-surface. The diffusion resistance model is expressed by a third resistance component RC which is connected in series to the second resistance component RB. In other words, the storage has resistive components RA to RC, an inductance component LX and a capacitive components CX and the internal resistance 42 is expressed by an impedance ZB as a complex impedance with these components. The control apparatus 60 calculates the impedance ZB.

In the lower part of FIG. 2, frequency characteristics of the impedance ZB are shown. The impedance ZB varies depending on the frequency F of the AC current signal commanded by the command signal such that the higher the frequency F to be applied, the larger the real part component ZR of the impedance ZB is in a low frequency region. Further, the imaginary part component ZI of the impedance ZB becomes zero at a first specific frequency Ftg1. Hereinafter, the impedance ZB of the first specific frequency Ftg1 is referred to as an ohmic resistance RH. In a higher frequency range than the first specific frequency Ftg1, the ohmic resistance model is dominant such that the higher the frequency F to be applied, the larger the absolute value of the imaginary part component ZI (the imaginary part becomes larger). According to the present embodiment, the first specific frequency Ftg1 corresponds to specified frequency and ohmic frequency.

On the other hand, in a lower frequency range than the first specific frequency Ftg1, the imaginary part component ZI becomes maximum value at the second specific frequency Ftg2. In a frequency range higher than the first specific frequency Ftg1 and lower than the second specific frequency Ftg2, the reaction resistance model is dominant and the absolute value of the imaginary part ZI increases and then decreases when the frequency F to be applied is lowered. Also, in a frequency range lower than the second specific frequency range Ftg2, the diffusion resistance mode is dominant such that the lower the frequency F to be applied, the larger the absolute value of the imaginary part component ZI is (the imaginary part component ZI becomes small).

Further, as shown in FIG. 1, the control apparatus 60 is connected to an IG switch 65. The IG switch 65 is a start switch of the vehicle. The control apparatus 60 monitors opened- and closed states of the IG switch 65.

The impedance ZB is known to be affected by the induced electromotive force Vid. Here, the induced electromotive force Vid is induced in the voltage response detection circuit including the storage battery 40 by a magnetic flux produced when current flows an electrical path such as the positive electrode side power source path L1 or the negative electrode side power source path L2. With the present embodiment, according to the power source system 10 in which the storage battery 40 is caused to output the AC signal for calculating the impedance ZB of the storage battery 40, current flows through the electrical path when causing the storage battery 40 to output the AC signal, and the induced electromotive force Vid is produced at the storage battery 40. When the induced electromotive force Vid is produced at the storage battery 40, the calculation accuracy (probability) of the impedance Zb is lowered.

In the lower part of FIG. 2, the impedance ZB when the induced electromotive force Vid is not produced at the storage battery 40 is indicated by a solid line, and the impedance ZB when the induced electromotive force Vid is produced is indicated by a dotted line. Hereinafter, the impedance ZB when the induced electromotive force Vid is not produced is referred to as a specific impedance ZB.

As shown in FIG. 2, the imaginary part component ZI of the impedance Z is not zero at the first specific frequency Ftg1. In this respect, the inventors of the present disclosure have continuously researched causes of the fact that the imaginary part component ZI of the impedance Z is not zero and discovered that the cause is that an error (difference) ΔZ due to the induced electromotive force Vid. The inventors focused on this fact and noticed that the impedance Z is corrected based on the error ΔZ which is the imaginary part component ZI of the impedance Z at the specific frequency Ftg1, whereby the impedance Z is accurately calculated.

In accordance with the above technique, the AC signal having the first specific frequency Ftg1 where the imaginary part component ZI of the specific impedance ZB is zero is applied to the storage battery 40 in an error calculation period TG, thereby calculating the error ΔZ. In other words, when the imaginary part component ZI of the impedance Z calculated with the AC signal having the first specific frequency Ftg1 applied to the storage battery 40 is not zero, the imaginary part component ZI thereof can be calculated as the error ΔZ due to the induced electromotive force Vid. Then, when the impedance Z of the storage battery 40 is calculated during an impedance calculation period TI different from the error calculation period TG, a correction process is executed based on the error ΔZ to correct the impedance Z of the storage battery 40. Thus, influence due to the induced electromotive force Vid is suppressed and the impedance Z of the storage battery 40 can be accurately calculated.

Figure 3:
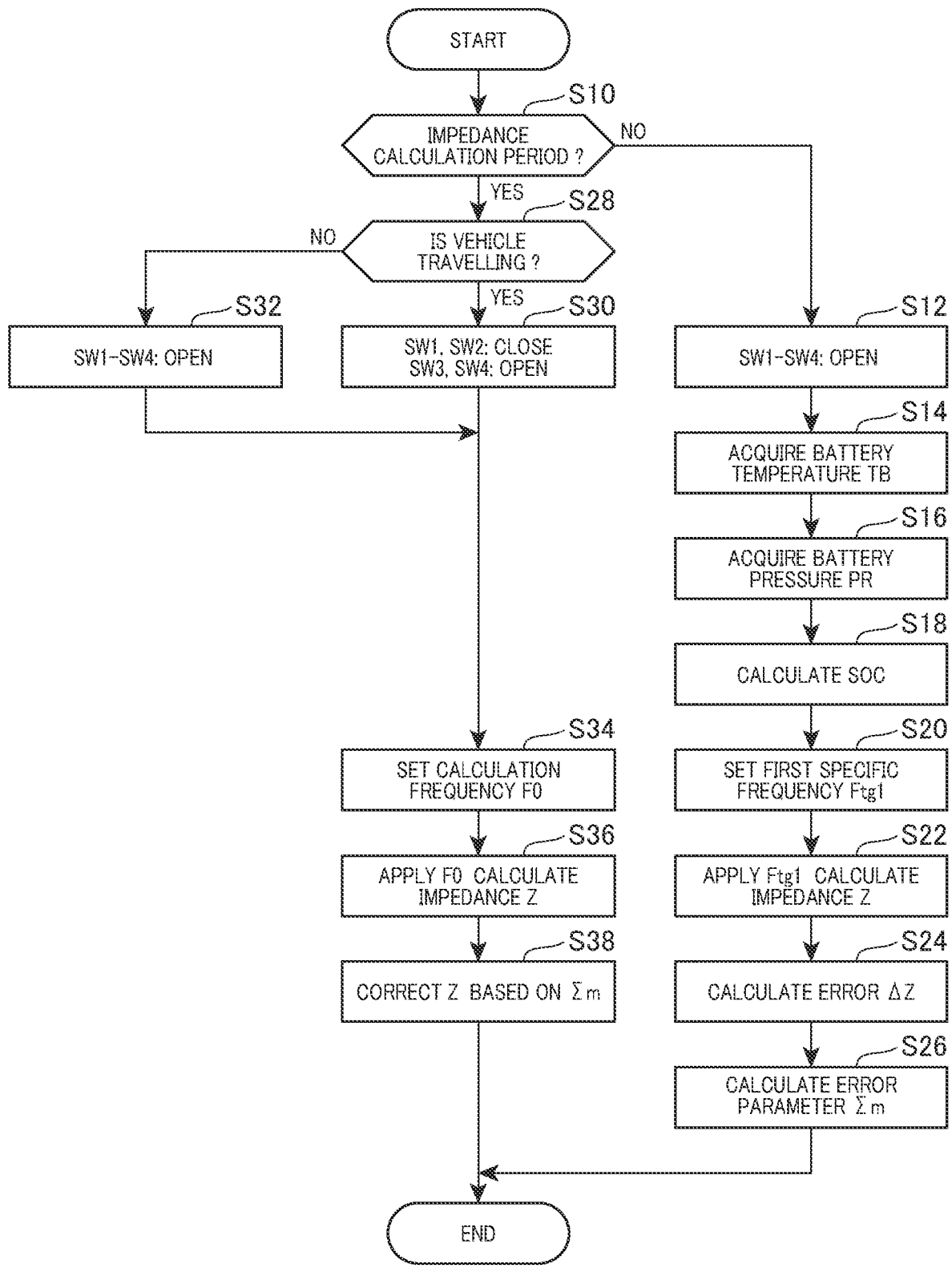
FIG. 3 is a flowchart showing a procedure of a correction process according to the first embodiment.

FIG. 3 shows a flowchart showing a correction process according to the present embodiment. The control apparatus 60 repeatedly executes the correction process at a predetermined control period.

When starting the control process, at step S10, the process determines whether it is in the impedance calculation period TI. For example, in a charging period where the charger 80 charges the storage battery 40, the IG switch is in the opened state and the inverter 30 is stopped. The present embodiment exemplifies a case in which the error calculation period TG is set during the charging period where the charger 80 charges the storage battery 40. When the process determines that it is in the error calculation period TG and decision at step S10 is negative, the process sets the first and second switches SW1 and SW2 to be opened at step S12. That is, according to the present embodiment, the process calculates the error ΔZ in a period where the first and second switches SW1 and SW2 are in an opened state (i.e. open period).

In the charging period of the storage battery 40, the charger 80 is connected to the first and second connection terminals TC1 and TC2. Then, the third and fourth switches SW3 and SW4 are set to be in the closed state to charge the storage battery 40. When the charging of the storage battery 40 is terminated, the third and fourth switches SW3 and SW4 are set to be in the opened state. According to the present embodiment, in a connection period where the first and second connection terminals TC1 and TC2 and the charger 80 are connected, the error ΔS is calculated in an open period where the third and fourth switches SW3 and SW4 are opened before charging the storage battery 40 or in an open period where the third and fourth switches SW3 and SW4 are opened after charging the storage battery 40. In other words, according to the present embodiment, the error ΔS is calculated during the connection period where the first and second connection terminals TC1 and TC2 and the charger 80 are connected and the open period where the third and fourth switches SW3 and SW4 are opened. Hence, at step S12, the process sets the third and fourth switches SW3 and SW4 together with the first and second switches SW1 and SW2 to be opened state.

At step S14, the process acquires the battery temperature TB of the storage battery 40 using the temperature sensor 63. At step S16, the process acquires the battery pressure PR using the pressure sensor 64. At step S18, the process calculates the SOC of the storage battery 40. The SOC of the storage battery 40 can be calculated as long as it is in a conduction stop period of the storage battery 40 for example, based on an open circuit voltage OCV which is a voltage acquired by the voltage sensor 61. Note that processes of steps S14 to S18 correspond to parameter acquiring unit according to the present embodiment.

At step S20, the process sets, based on the battery temperature TB, the battery pressure PR and the SOC which are acquired by steps S14 to S18, the first specific frequency Ftg1 that calculates the ohmic resistance RH of the storage battery 40. The first specific frequency Ftg1 refers to a frequency correlated to the battery temperature TB, the battery pressure PR and the SOC.

For example, at step S14, when an amount of change of the battery temperature TB detected by the temperature sensor 63 in a prescribed period is within a predetermined amount of change, the battery temperature TB is a balanced state. Hence, the average value thereof is acquired as the battery temperature TB of the storage battery 40. Then, at step S20, the process applies a command signal corresponding to the acquired battery temperature TB to the current modulation circuit 50. Specifically, a memory unit 66 of the control apparatus 60 stores correlation information showing a correlation between the first specific frequency and the battery parameter for respective battery parameters such as the battery temperature TB, the battery pressure PR and the SOC. At step S20, the correlation information stored in the memory unit 66 is utilized to set the first specific frequency Ftg1 corresponding to the battery temperature TB, the battery pressure PR and the SOC acquired at steps S14 to S18.

At step S22, the process applies the AC signal having the first specific frequency Ftg1 set at step S20 to the storage battery 40, thereby calculating the impedance Z of the storage battery 40. At step S22, since an induced electromotive force Vid is produced at the storage battery 40 when applying the AC signal having the first specific frequency Ftg1, the process calculates the impedance Z when the induced electromotive force is produced, not the impedance ZB when the induced electromotive force Vis is not produced.

At step S24, the process calculates an error ΔZ which is the imaginary part component ZI of the impedance Z calculated at step S22. At subsequent step S26, the process calculates an error parameter Σm as a value where the error ΔZ is divided by a specific angular frequency ωm as an angular frequency corresponding to the first specific frequency Ftg1, and terminates the correction process. The calculated error parameter Σm is stored in the memory unit 66 of the control apparatus 60. The specific angular frequency ωm and the error parameter Σm are expressed by the following equations (1) and (2). In the present embodiment, the specific angular frequency ωm corresponds to prescribed angular frequency and the error parameter Σm corresponds to impedance error.

$$\omega m = 2\pi \times Ftg1 \quad \text{(equation 1)}$$

$$\Sigma m = \Delta Z/\omega m \quad \text{(equation 2)}$$

According to the present embodiment, in the equation 2, the error ΔZ only includes the imaginary part component ZI. In the case where the calculated error parameter Σm is not within the prescribed range, the error parameter Σm may be calculated again. According to the present embodiment, the process at step S24 corresponds to error calculation unit.

On the other hand, at step S10, the process determines that it is in the impedance calculation period TI when it is not in the error calculation period TG, determines the process at step S10 to be affirmative and proceeds to step S28. At step S28, the process determines whether the vehicle is travelling or not. Note that the process determines whether the vehicle is travelling using a vehicle speed sensor or the like which is not shown. For example, when the vehicle is travelling, the impedance Z is sometimes measured in order to estimate the temperature of the storage battery 40. In the case where the impedance Z is calculated when the vehicle is travelling, the determination at step S28 is affirmative. Then, at step S30, the process sets the first and second switches SW1 and SW2 to be closed state and sets the third and fourth switches SW3 and SW4 to be opened state.

Further, for example, when the vehicle is stopped, the impedance Z is sometimes calculated in order to calculate the SOC of the storage battery 40. In the case where the impedance Z is calculated when the vehicle is stopped, the determination at step S10 is negative. At subsequent step S32, the process sets the first to fourth switches SW1 to SW4 to be closed state.

At step S34, the process sets a calculation frequency F0 for calculating the impedance Z of the storage battery 40. Here, the calculation frequency F0 is set based on a travelling state of the vehicle and an operation state of the inverter 30. The calculation frequency F0 may preferably be set to be apart from a frequency of a vibration due to the travelling of the vehicle and a frequency of electrical signal due to inverter-operation, and set to be a frequency with which the purpose of calculating the impedance Z is satisfied.

At step S36, the process applies the AC signal having the calculation frequency F0 set at step S34 and calculates the impedance Z of the storage battery 40. According to the present embodiment, the process at step S36 corresponds to impedance calculation unit.

At step S38, the process corrects the impedance Z calculated at step S36 based on the error parameter $\Sigma m$ calculated at step S24 and terminates the correction process. Specifically, the process calculates a correction value HV as a value in which the error parameter $\Sigma m$ is multiplied by a calculation frequency $\omega 0$ which is an angular frequency corresponding to a calculation frequency F0. Then, the process subtracts the correction value HV from the impedance Z calculated at step S36, thereby correcting the impedance Z calculated at step S36. The calculation frequency $\omega 0$ and the correction value HV are expressed by the following equation (3) and equation (4).

$$\omega 0 = 2\pi \times F0 \quad \text{(equation 3)}$$

$$HV = \omega 0 \times \Sigma m \quad \text{(equation 4)}$$

Note that the process at step S38 corresponds to correction unit according to the present embodiment.

Figure 4:
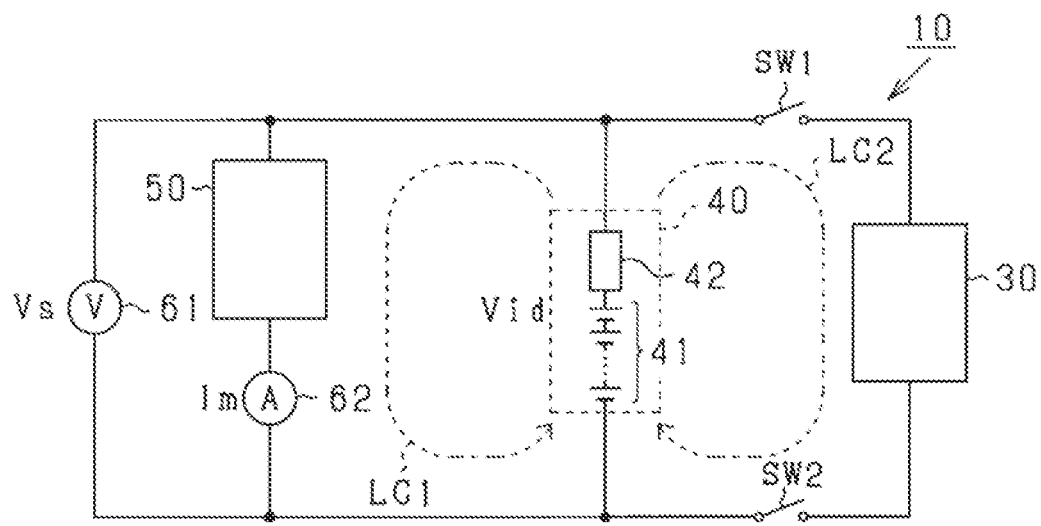
FIG. 4 is a diagram showing a closed circuit to produce an induced electromotive force.

Subsequently, an example of the correction process will be shown in FIGS. 4 to 6. FIG. 4 shows a diagram showing a simplified configuration of the power source system 10. During the error calculation period TG, the first and second switches SW1 and SW2 are in the opened states. In FIG. 4, in order to facilitate understanding of the configuration, the motor 20, the first and second connection terminals TC1 and TC2, the third and fourth switches SW3 and SW4, the control apparatus 60, the temperature sensor 63, the pressure sensor 64 and the IG switch 65 are omitted.

During the error calculation period TG, when the current modulation circuit 50 applies the AC signal having the first specific frequency Ftg1 to the storage battery 40, an induced electromotive force Vid is produced in the storage battery 40. In this case, the impedance Z of the storage battery 40 calculated with the I-V method is expressed by the following equation 5 using the variation voltage Vs detected by the voltage sensor 61 and the variation current Im detected by the current sensor 62.

$$Z = (Vs + Vid)/Im = Vs/Im + Vid/Im \quad \text{(equation 5)}$$

The first item in the right side of the above equation 5 expresses the specific impedance ZB. Also, the second item thereof expresses the error $\Delta Z$ due to the induced electromotive force Vid.

Here, the error $\Delta Z$ will be considered. The induced electromotive force Vid that constitutes the error $\Delta Z$ is expressed by the following equation 6 using Faraday's laws.

[Math 1]

$$Vid = -\int_S \frac{\partial}{\partial t} B(x, t) \cdot dS \quad \text{(equation 6)}$$

Figure 5:
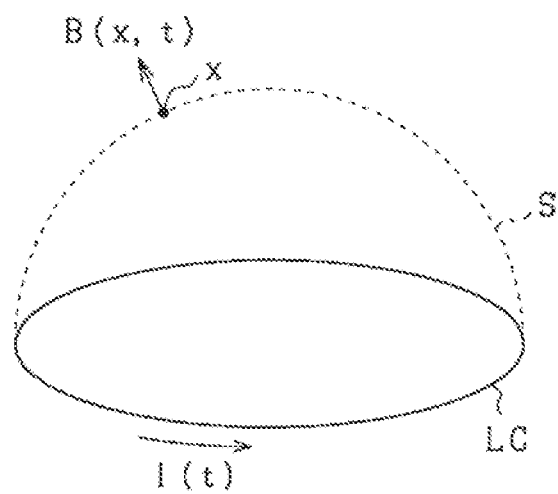
FIG. 5 is an explanatory diagram showing Faraday's laws and Biot-Savart's law.

As shown in FIG. 5, S indicates an arbitrary surface surrounded by a closed circuit LC that produces an induced electromotive force Vid, t indicates a time, and B (x, t) indicates a magnetic flux density vector at a point x on the surface S. As shown in FIG. 4, the power source system 10 includes, as the closed circuit LC that produces an induced electromotive force Vid, a first closed circuit LC1 constituted of the storage battery 40, the current modulation circuit 50 and the current sensor 62, and a second closed circuit LC2 constituted of the storage battery 40, the first and second switches SW1 and SW2 and the inverter 30. Note that B (x, t) is expressed by the following equation 7 using Biot-Savart's law.

[Math 2]

$$B(x, t) = \frac{\mu_0}{4\pi} \int_{LC} \mu_r(x) \frac{I(t)ds \times (x - s)}{|x - s|^3} \quad \text{(equation 7)}$$

Here, $\mu 0$ indicates space permeability, $\mu r$ indicates relative permeability at a point x and I (t) indicates a current flowing through the closed circuit LC. For example, the current I (t) flowing through the first closed circuit LC1 is a variation current Im (t), and the current I (t) flowing through the second closed circuit LC2 is an inverter current Ie (t) flowing through the inverter 30. When substituting the equation 7 for the equation 6 and assuming that the surface S is not changed by the time t, that is, the closed circuit LC is not changed by the time t, the induced electromotive force Vid is expressed by the following equation 8.

[Math 3]

$$Vid = -\left(\frac{\partial}{\partial t} I(t)\right) \frac{\mu_0}{4\pi} \int_S \left\{\int_{LC} \mu_r(x) \frac{ds \times (x - s)}{|x - s|^3}\right\} dS \quad \text{(equation 8)}$$

Figure 9:
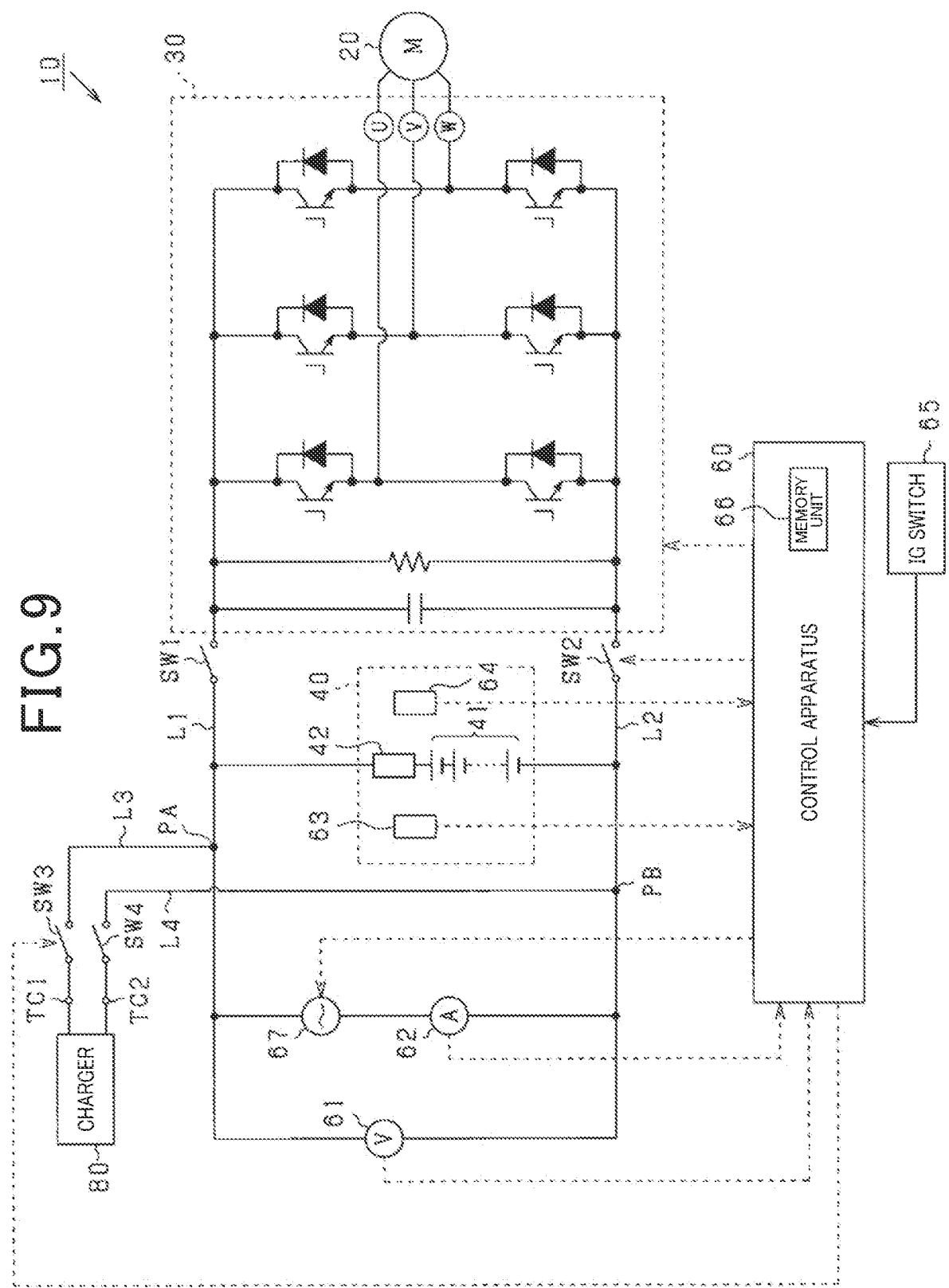
FIG. 9 is a diagram showing an overall confirmation of a power source system according to a third embodiment.

In the equation 8, an item which is not changed by the time t, that is, an item determined by a formation of the closed circuit LC, is referred to as an error parameter $\Sigma$ (see FIG. 9). Further, the current I (t) is expressed by the equation (10) as a sinusoidal wave current having arbitrary phase $\beta$. In this case, the induced electromotive force Vid is expressed by the equation 11.

[Math 4]

$$\Sigma = \frac{\lambda_0}{4\pi} \int_S \left\{ \int_{LC} \mu_r(x) \frac{ds \times (x-s)}{|x-s|^3} \right\} dS \quad \text{(equation 9)}$$

$$I(t) = Ie^{j(\omega t + \beta)} \quad \text{(equation 10)}$$

$$Vid = -j\omega I(t)\Sigma \quad \text{(equation 11)}$$

Here, ω refers to an angular frequency of the current I (t). The induced electromotive force Vid shown in the equation 11 is produced at each closed circuit LC. In the power source system 10, the induced electromotive force Vid can be produced at the first closed circuit and the second closed circuit. The induced electromotive force Vid (LC1) produced at the first closed circuit LC1 when the AC signal having the first specific frequency Ftg1 is applied to the storage battery 40 is expressed by the equation (12) using the specific angular frequency ωm, the variation current Im (t) and the error parameter Σm. The induced electromotive force Vid (LC2) produced at the second closed circuit LC2 is expressed by the equation (13) using the specific angular frequency ωe of an inverter current Ie (t), the inverter current Ie (t), the error parameter Σe of the second closed circuit LC2 and a phase difference Δe between the variation current Im (t) and the inverter current Ie (t).

[Math 5]

$$Vid(LC1) = -j\omega_m I_m \Sigma_m \quad \text{(equation 12)}$$

$$Vid(LC2) = -j\omega_e I_e \Sigma_e e^{j\Delta e} \quad \text{(equation 13)}$$

The error ΔZ is expressed by equation (14) using the above equation (12) and equation (13).

[Math 6]

$$\Delta Z = -j\omega_m \Sigma_m - j\omega_e \frac{I_e}{I_m} \Sigma_e e^{j\Delta e} \quad \text{(equation 14)}$$

During the error calculation period TG, the first and second switches SW1 and SW2 are in the closed state, the inverter current Ie (t) is 0. Hence, the second item in the right side of the above equation 14 is 0. Hence, the impedance Z is expressed by the equation 15 using the specific impedance ZB.

$$Z = ZB - j\omega m\Sigma m \quad \text{(equation 15)}$$

According to the above equation 15, the followings can be understood. That is, when the AC signal having the first specific frequency Ftg1 is applied to the storage battery during the error calculation period TG, the imaginary part component ZI of the specific impedance ZB is 0. Hence, as long as the imaginary part component ZI of the calculated impedance Z is not 0, the error ΔZ which is the imaginary part component ZI is divided by the specific angular frequency ωm, thereby calculating the error parameter Σm.

As described above, the error parameter Σm does not vary by the time t, but the error parameter Σm is determined by the formation of the first closed circuit LC1. In other words, as long as the formation of the first closed circuit LC1 is constant, the error parameter Σm is constant regardless of the time t. Therefore, if the error parameter Σm can be calculated during the error calculation period TG, the induced electromotive force Vid produced at the first closed circuit LC1 can be corrected during the impedance calculation period TI which is different from the error calculation period TG, using the error parameter Σm calculated during the error calculation period TG.

For example, a phase of the impedance Z calculated during the impedance calculation period TI, where the induced electromotive force Vid (LC2) produced at the second closed circuit LC2 is 0, is defined as θ (β=θ). The impedance calculation period is, for example, a period where the inverter 30 is stopped when the vehicle is being stopped. Further, a phase of the specific impedance ZB is defined as α (β=α). In this case, the real part ZR, the imaginary part component ZI and the phase θ of the impedance Z are expressed by the following equations 16 to 18 using the calculation frequency ω0 during the impedance calculation period TI.

[Math 7]

$$ZR = \left(\sqrt{|ZB|^2(\omega_0 \Sigma_m)^2 + 2|ZB|\omega_0 \Sigma_m \sin \alpha}\right) \cos \theta \quad \text{(equation 16)}$$

$$ZR = \left(\sqrt{|ZB|^2(\omega_0 \Sigma_m)^2 + 2|ZB|\omega_0 \Sigma_m \sin \alpha}\right) \sin \theta \quad \text{(equation 17)}$$

$$\theta = \tan^{-1}\left(\tan \alpha - \frac{\omega_0 \Sigma_m}{|ZB|\cos\alpha}\right) \quad \text{(equation 18)}$$

According to the above equations 16 to 18, none of the real part ZR, the imaginary part component ZI and the phase θ depends on the variation current Im (t). Hence, even in the case where the variation current Im (t) is set to be larger, the impedance Z calculated during the impedance calculation period TI can be corrected by using the correction value HV shown in the above-describe equation 4 and the above equations 16 to 18.

Figure 6:
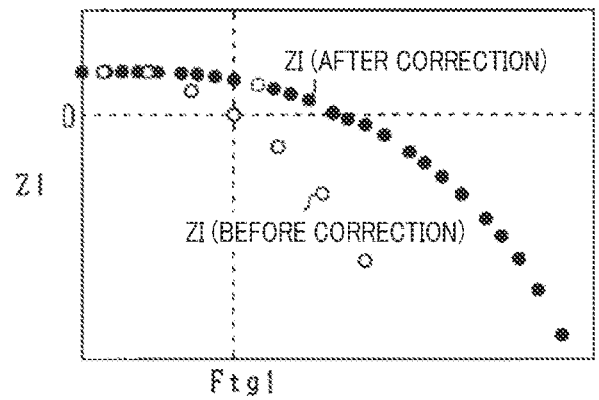
FIG. 6 is a diagram showing a relationship between a logarithm value of a calculation frequency and an imaginary part component of the impedance.

FIG. 6 shows a correspondence between a logarithm value of a calculation frequency F0 and an imaginary part component ZI of the impedance Z. As shown in FIG. 6, the imaginary part component ZI before being corrected indicated with a white circle is calculated to be lower than that of the imaginary part component ZI after being corrected indicated with a black circle. Hence, the impedance Z can be corrected such that the imaginary part component ZI of the impedance Z is larger using the error parameter Σm. Further, as shown in the equation 4 and equations 15 to 17, since the correction value HV is proportional to the calculation frequency ω0, that is, the calculation frequency F0, a difference between the imaginary part component ZI after being corrected and the imaginary part component ZI before being corrected becomes larger as the calculation frequency F0 is higher. Hence, when using the error parameter Σm, an influence from the induced electromotive force Vid is suppressed specifically in a high frequency region of the calculation frequency F0, whereby the impedance Z can be accurately calculated.

According to the above embodiment described in detail, the following effects and advantages can be obtained.

According to the present embodiment, during the error calculation period TG, the AC signal having the first frequency Ftg1 with which the imaginary part component of the specific impedance ZB of the storage battery 40 is 0, is applied to the storage battery 40, and the AC signal and a response signal corresponding to the AC signal are utilized to calculate the error ΔZ. In other words, as long as the imaginary part component ZI of the impedance Z calculated by applying the AC signal having the first specific frequency Ftg1 is not 0, the imaginary part component ZI can be calculated as the error ΔZ due to the imaginary part component ZI. Then, in the case where the impedance Z of the storage battery 40 is calculated during the impedance calculation period TI different from the error calculation period TG, the impedance Z of the storage battery 40 is corrected based on the error ΔZ. Thus, the impedance Z of the storage battery 40 can be accurately calculated suppressing an influence of the induced electromotive force Vid.

Specifically, when an induced electromotive force that influences a voltage-change circuit including the storage battery 40 exceeding a prescribed amount of error is not produced, the real part ZR of the impedance Z calculated by applying the AC signal having the first specific frequency Ftg1 as an ohmic frequency to the storage battery 40 is an ohmic resistance RH and the imaginary part thereof is 0. According to the present embodiment, when calculating the error ΔZ, the Ac signal having the first specific frequency Ftg1 is applied to the storage battery 40. Hence, when the imaginary part component ZI of the calculated impedance Z is not 0, the imaginary part component ZI can be regarded as an error ΔZ.

The first specific frequency Ftg1 varies depending on the battery temperature TB, the battery pressure PR and the SOC of the storage battery 40. According to the present embodiment, the battery parameters such as the battery temperature TB, the battery pressure PR and the SOC of the storage battery 40 are acquired, and the AC signal having the first specific frequency Ftg1 corresponding to these battery parameters is applied to the storage battery 40, thereby calculating the error ΔZ. Therefore, the impedance Z of the storage battery 40 can be accurately calculated suppressing an influence from the variations in the battery temperature TB, the battery pressure PR and the SOC of the storage battery 40.

The error ΔZ is affected by current flowing through the inverter 30 with a smoothing capacitor that constitutes the inverter 30 and stray capacitances of the switches that constitute the inverter 30. Hence, when the error ΔZ is calculated during the conduction period of the inverter 30 where the first and second switches SW1 and SW2 are closed, the accuracy of calculating the error ΔZ is lowered. In this respect, according to the present embodiment, the error ΔZ is calculated in an open period where the first and second switches SW1 and SW2 are opened. Thus, an influence of the current flowing through the inverter 30 is suppressed and the error ΔZ due to the induced electromotive force caused by the AC signal for calculating the impedance Z can be calculated. As a result, the impedance Z of the storage battery 40 can be accurately calculated.

Similar to the error ΔZ, the impedance Z is affected by the current flowing through the inverter 30. In this respect, according to the present embodiment, the impedance Z is calculated during the open period of the first and second switches SW1 and SW when the vehicle is stopped. Thus, an influence of the current flowing through the inverter 30 is suppressed, and the impedance Z can be calculated. As a result, the impedance Z of the storage battery 40 can be accurately calculated.

Further, the impedance Z is calculated, as long as the vehicle is travelling, during the conduction period of the inverter 30 in which the first and second switches SW1 and SW2 are closed. Thus, after calculating the error ΔZ due to the induced electromotive force Vid caused by the AC signal for calculating the impedance Z, error ΔZ during the conduction period of the inverter 30 can be calculated. Hence, an influence of the current flowing through the inverter 30 can be detected.

(Modifications of First Embodiment)

The closed circuit LC is not limited to a closed circuit connected to the storage battery 40. For example, in the current modulation circuit 50 shown in FIG. 1, also a detection circuit for detecting the variation current Im composed of the resistor 52 and the current detection amplifier 54 serves as the closed circuit LC that produces an induced electromotive force Vid.

Figure 7:
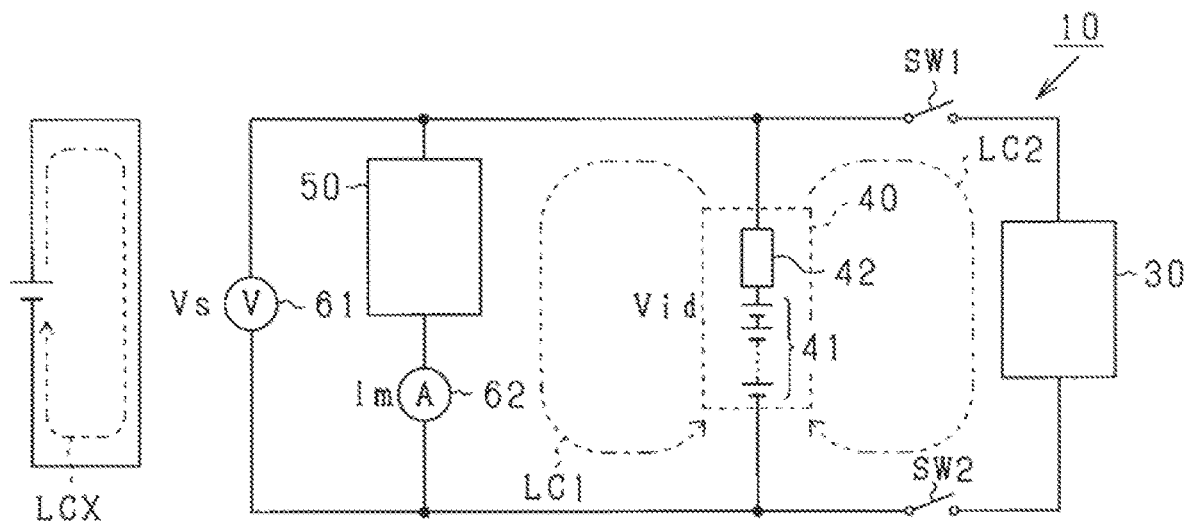
FIG. 7 is a diagram showing an overall configuration of a power source system according to a modification of the first embodiment.

Also, as shown in FIG. 7, in the case where an external closed circuit LCX which is not connected to the storage battery 40 is present being closely located to the power source system 10, the external closed circuit LCX also serves as the closed circuit LC which produces the induced electromotive force Vid. In the case where the external closed circuit LCX is allowed to be disposed inside the vehicle, the external closed circuit LCX may be provided outside the vehicle. The induced electromotive force Vid (LCX) produced by the external closed circuit LCX when applying the AC signal having the first specific frequency Ftg1 to the storage battery 40 is expressed by the equation 19 using an angular frequency ωx of an external current Ix (t) flowing through the external closed circuit LCX, the external current Ix (t), an error parameter Σx of the external closed circuit LCX and a phase difference Δx between the variation current Im (t) and the external current Ix (t).

[Math 8]

$$Vid(LCX) = -j\omega_x I_x \Sigma_x e^{j\Delta x} \quad \text{(equation 19)}$$

The error ΔZ is expressed by the equation 20 using the above equations 12 and 19.

[Math 9]

$$\Delta Z = -j\omega_m \Sigma_m - j\omega_x \frac{I_x}{I_m} \Sigma_x e^{j\Delta x} \quad \text{(equation 20)}$$

Hence, the impedance Z is expressed by the equation 21 using the specific impedance ZB.

[Math 10]

$$Z = ZB - j\omega_m \Sigma_m - j\omega_x \frac{I_x}{I_m} \Sigma_x e^{j\Delta x} \quad \text{(equation 21)}$$

As shown in the equation 20, the error ΔZ is expressed by a sum of the errors for respective closed circuits LC. Hence, in a state where the external closed circuit LCX is not present, when a sum of the first item and the second item in the right side of the equation 21 is calculated using the equation 15 by a simulation or the like, the error parameter Σx and an amount of influence from the phase difference Δx can be calculated. As a result, even in a case where the external closed circuit LCX is present, the impedance Z calculated during the impedance calculation period TI can be corrected.

Second Embodiment

Hereinafter, with reference to FIG. 8, for a second embodiment, a configuration different from the first embodiment will mainly be described.

The present embodiment differs from the first embodiment in that the error ΔZ and the impedance Z are calculated in the control process during the power running operation of the motor 20 or the regenerative power generation.

Figure 8:
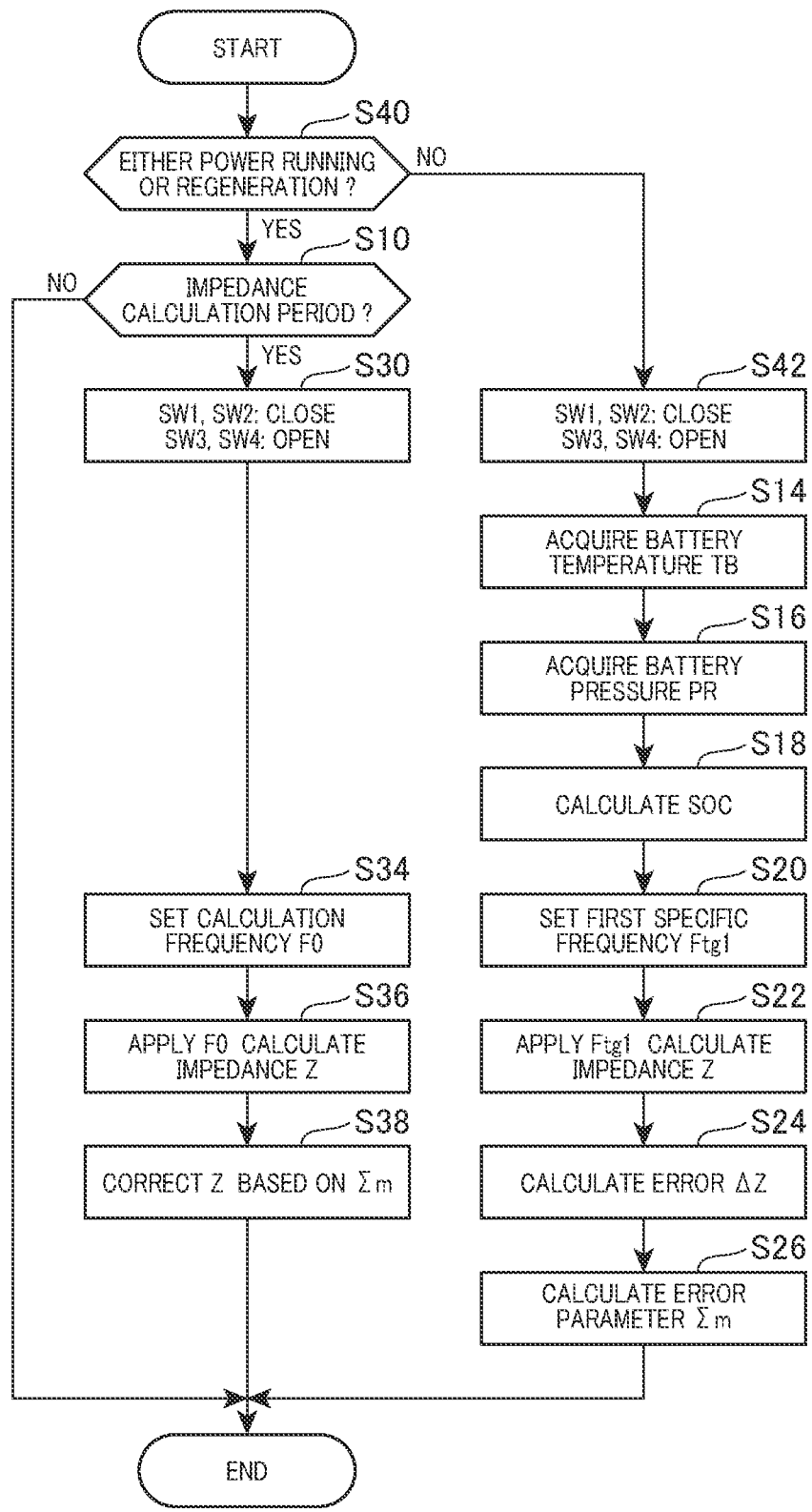
FIG. 8 is a flowchart showing a procedure of a correction process according to a second embodiment.

FIG. 8 shows a flowchart of a correction process of the present embodiment. Once the control process is activated, at step S40, the process determines whether the motor 20 is performing power running operation or regenerative power operation. For example, the control apparatus 60 acquires a rotational speed of the motor 20 using a rotational angle sensor (not shown), and determines whether the motor 20 is performing the power running operation or it is in the regenerative power operation.

When the motor is in the performing power running operation or regenerative power operation, a charge-discharge current flows between the storage battery 40 and the motor 20. The present embodiment exemplifies a case where an error calculation period TG and an impedance calculation period TI are set in the power running driving operation or the regenerative power generation operation TI. When the determination at step S40 is affirmative, the process proceeds to step S10. On the other hand, when the determination at step S40 is negative, the process terminates the control process.

At step S10, the process determines whether it is in the impedance calculation period TI. When the process determines that it is in the error calculation period TG and decision at step S10 is negative, the process sets the first and second switches SW1 and SW2 to be in the closed state. In other words, according to the present embodiment, the process calculates the error ΔZ during a period where the first and second switches SW1 and SW2 (i.e. closed period) are closed by using the charge-discharge current of the storage battery 40. Generally, in the power running operation of the motor 20 or in the regenerative power generation operation, the charger 80 is not connected to the first and second connection terminals TC1 and TC2. Hence, at step S42, the process sets the third and fourth switches SW3 and SW4 to be in the opened states and proceeds to step S14.

On the other hand, when determining that it is in the impedance calculation period TI and the decision at step S10 is affirmative, the process proceeds to step S30. That is, according to the present embodiment, the first and second switches SW1 and SW1 are set to be in a closed state, the impedance Z is calculated using the charge-discharge current of the storage battery 40 during the closed period of the first and second switches SW1 and SW2, and the third and fourth switches SW3 and SW4 are set to be in the opened state.

According to the above-described embodiment, the following effects and advantages can be obtained.

The storage battery 40 exchanges power with the motor 20 via the inverter 30. According to the present embodiment, the error ΔZ is calculated during the closed period of the first and second switches SW1 and SW2. Thus, the charge-discharge current flowing between the storage battery 40 and the motor 20 is utilized to calculate the error ΔZ.

The impedance Z is influenced by the current flowing through the inverter 30. In the case where the influence from the current is different from the influence when the error ΔZ is calculated, an accuracy for correcting the impedance Z using the error ΔZ is lowered. In this respect, according to the present embodiment, similar to the case of calculating the error ΔZ, the impedance Z is calculated when the first and second switches SW1 and SW2 are in the closed state. Thus, the impedance Z can be accurately calculated while suppressing the influence from the current flowing through the inverter 20. Further, according to the present embodiment, the impedance Z can be calculated while the storage battery 40 is being charged or discharged.

Third Embodiment

Hereinafter, with reference to FIG. 9, for a third embodiment, a configuration different from the first embodiment will mainly be described.

The present embodiment differs from the first embodiment in that the storage battery 40 is caused to output a predetermined AC signal by applying a power to the storage battery 40. As shown in FIG. 9, the power source system 10 is provided with an oscillator device 67 instead of the current modulation circuit 50. The oscillator device 67 is connected in series to the current sensor 62 in a portion close to the positive side power source path L. The oscillator device 67 outputs a predetermined AC signal when receiving the command signal from the control apparatus 60.

According to the present embodiment described in detail so far, effects and advantages similar to the first embodiment can be obtained.

Fourth Embodiment

Figure 10:
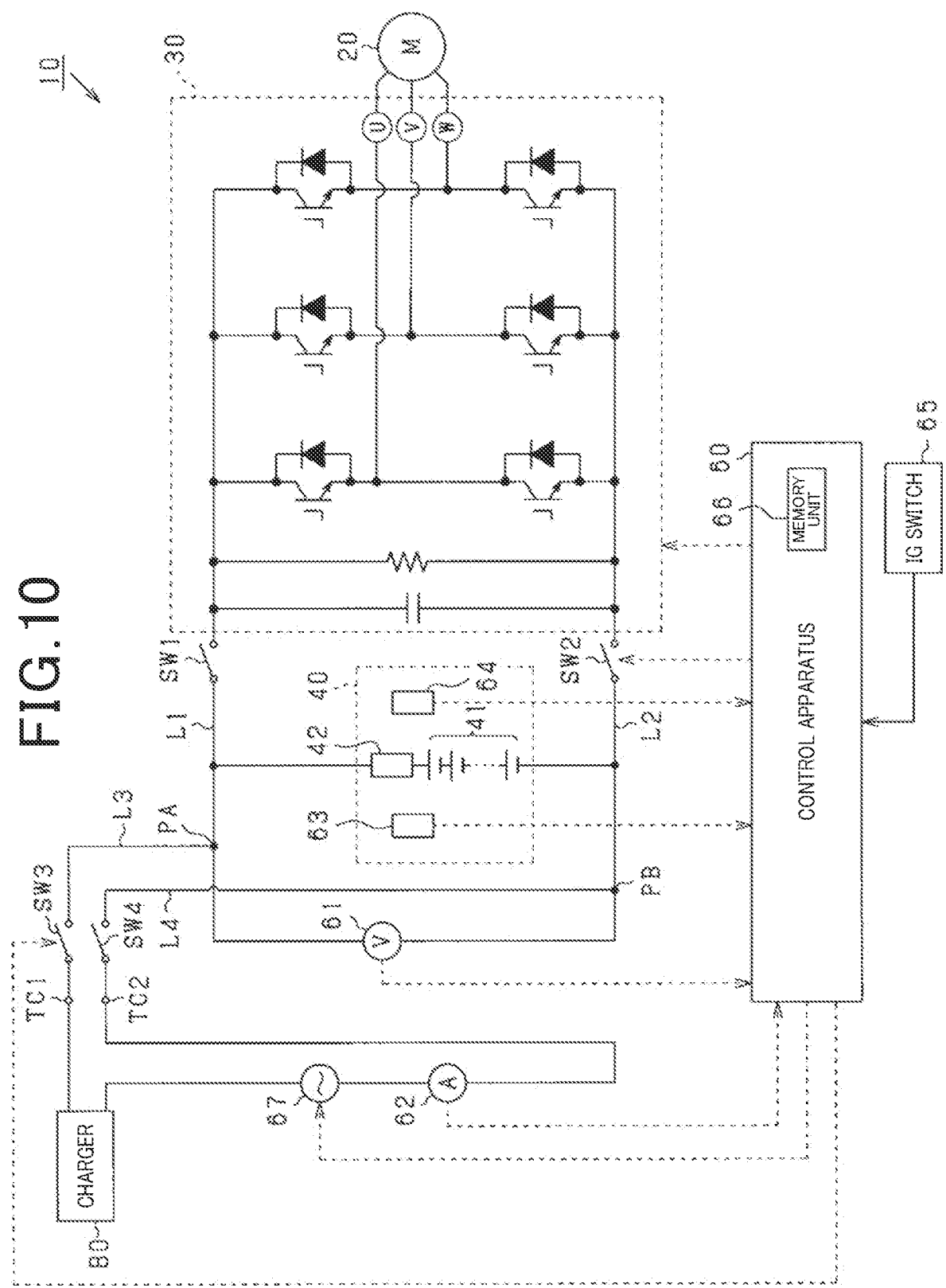
FIG. 10 is a diagram showing an overall confirmation of a power source system according to a fourth embodiment.

Hereinafter, with reference to FIGS. 10 and 11, for a fourth embodiment, a configuration different from the third embodiment will mainly be described.

The present embodiment differs from the third embodiment in that the oscillator device 67 and the current sensor 62 are provided in the charger 80 side. As shown in FIG. 10, the oscillator device 67 and the current sensor 62 are connected in series to a portion between the charger 80 and the second connection terminal TC2 in a state where the charger 80 is connected to the first and second connection terminals TC1 and TC2. The oscillator device 67 outputs a predetermined AC signal to the storage battery 40 when receiving the command signal from the control apparatus 60, the current sensor 62 detects the variation current Im and transmits the detected variation current Im to the control apparatus 60.

Figure 11:
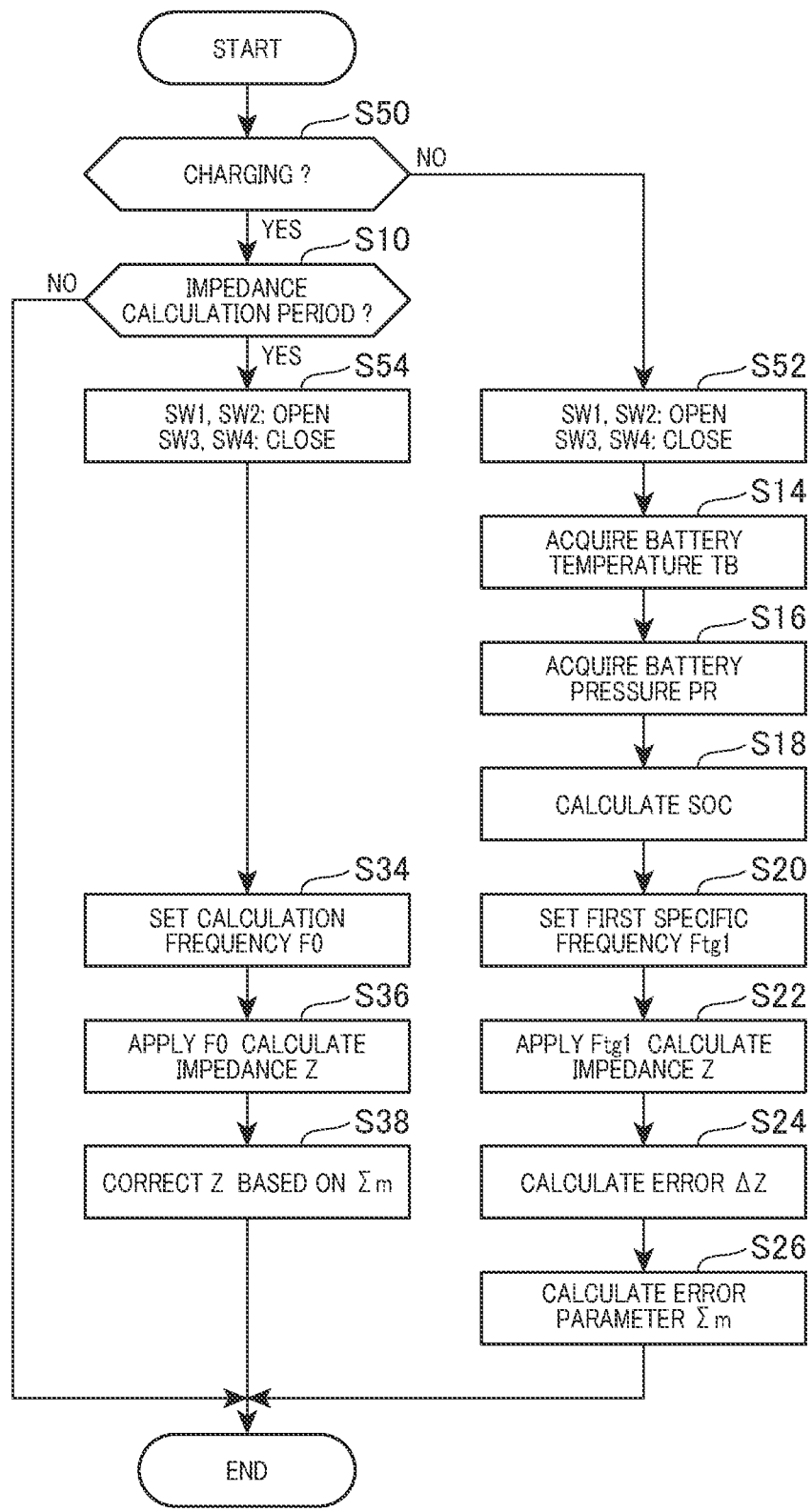
FIG. 11 is a flowchart showing a procedure of a correction process according to the fourth embodiment.

FIG. 11 is a flowchart showing a correction process according to the present embodiment. The present embodiment differs from the third embodiment in that the error ΔZ and the impedance Z are calculated in a charging period of the storage battery 40 by the charger 80.

When activating the control process, at step S50, the process determines whether the storage battery 40 is in the charging period by the charger 80. For example, the control apparatus 60 determines, based on the variation current Im transmitted from the current sensor 62 whether the storage battery 40 is in the charging period by the charger 80.

During the charging period of the storage battery 40, charge current flows to the storage battery from the charger 80. The present embodiment exemplifies a case where the error calculation period TG and the impedance calculation period TI are set during the charging period of the storage battery 40. When determined at step S50 to be affirmative, process proceeds to step S10. On the other hand, when the decision at step S50 is negative, process terminates the control process.

At step S10, the process determines whether it is in the impedance calculation period TI. When the process determines that it is in the error calculation period TG and the decision at step S10 is negative, the process sets the first and second switches SW1 and SW2 to be in the open state, sets the third and fourth switches SW3 and SW4 to be in the closed state and proceeds to step S14. In other words, according to the present embodiment, the error ΔZ is calculated using the charge current of the storage battery 40 during the open period of the first and second switches SW1 and SW2.

On the other hand, when determining that it is in the impedance calculation period TI and the decision at step S10 is affirmative, the process sets, at step S54, the first and second switches SW1 and SW2 to be in the opened state, sets the third and fourth switches SW3 and SW4 to be in the closed state, and proceeds to step S34. According to the present embodiment, the impedance Z is calculated during the open period of the first and second switches SW1 and SW2 using the charge-discharge current of the storage battery 40.

According to the present embodiment described in detail, the following effects and advantages can be obtained.

The storage battery 40 exchanges power with the motor 20 via the inverter 30. Also, the storage battery 40 may be capable of being charged by an external charger 80 outside the power source system 10. According to the present embodiment, the error ΔZ is calculated during the charging period of the storage battery 40 by the charger 80. Thus, the charge current flowing from the charger 80 to the storage battery 40 is utilized, whereby the error ΔZ can be calculated. Further, during the charging period of the storage battery 40, since the third and fourth switches SW3 and SW4 are closed and the first and second switches SW1 and SW2 are opened, the error ΔZ can be calculated while suppressing an influence from the current flowing through the inverter 30 with a smoothing capacitor that constitutes the inverter 30 and stray capacitances of the switches that constitute the inverter 30.

The impedance Z is affected by the current flowing through the inverter 30. According to the present embodiment, the impedance Z is calculated during the open period of the first and second switches SW1 and SW2 and during the closed period of the third and fourth switches SW3 and SW4. Thus, the charge current of the storage battery 40 flowing from the charger 80 to the storage battery 40 is utilized, whereby the impedance Z can be calculated. Also, the impedance Z can be calculated suppressing an influence due to noise or the like caused by the charge current leaking to the inverter 30.

Fifth Embodiment

Hereinafter, with reference to FIG. 12, for a fifth embodiment, a configuration different from the first embodiment will mainly be described.

The present embodiment differs from the first embodiment in that a charge control apparatus 81 of the charger 80 instead of the control apparatus of the power source system 10 calculates the error ΔZ. Hereinafter, a fourth embodiment in which a battery management system according to the present disclosure is applied to a battery management system 100 that manages the storage battery 40 included in the power source system 10 of the vehicle will be described.

Figure 12:
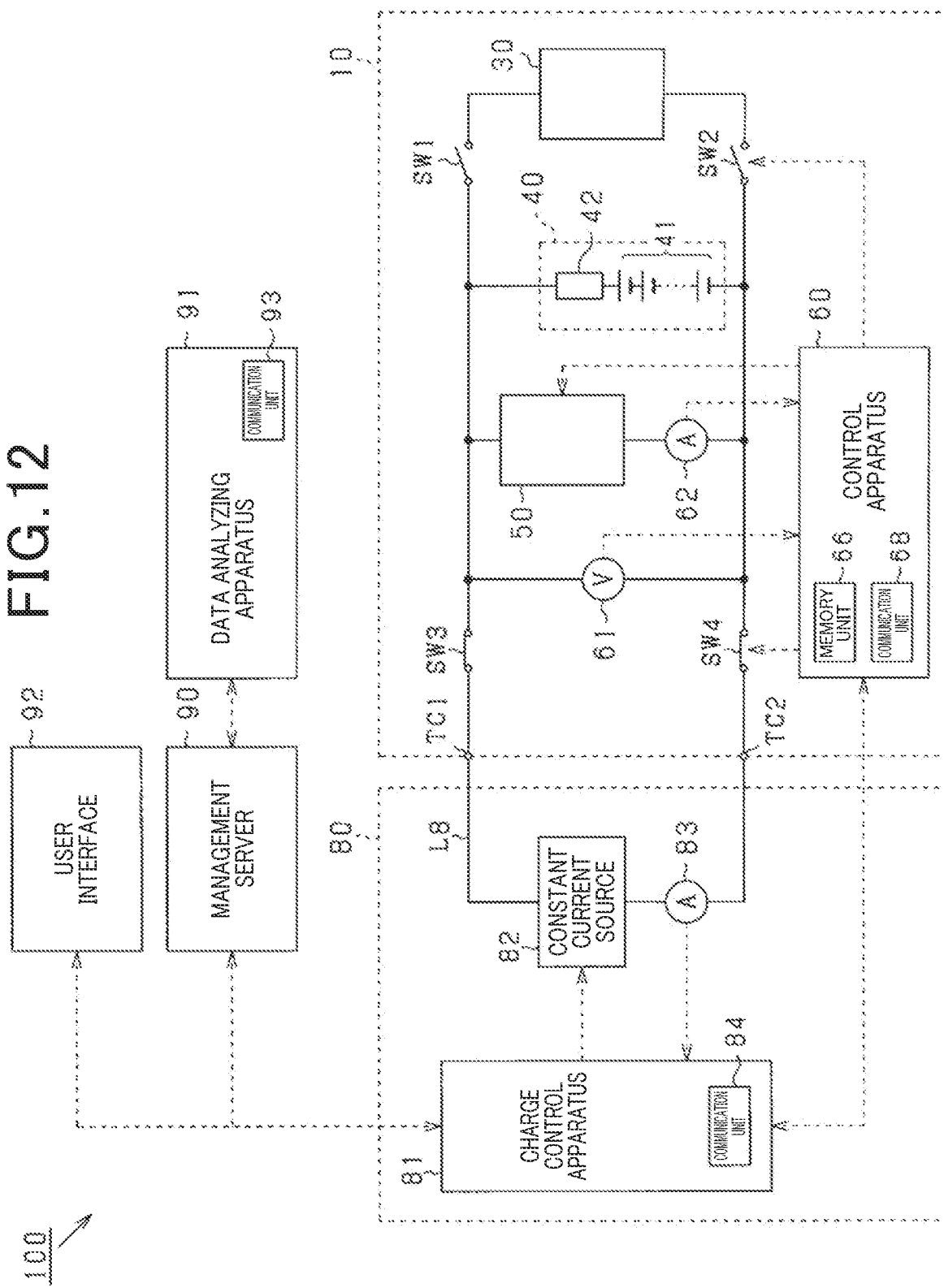
FIG. 12 is a diagram showing a battery management system according to a fifth embodiment.

As shown in FIG. 12, the battery management system 100 is provided with a charger 80, a management server 90 as an external server 90, a data analyzing unit 91 and a user interface 92.

The charger 80 charges the storage battery 40 of the power source system 10 when being connected to the power source system 10. The charger 80 is provided with a charge control apparatus 81, a constant current source 82 and a current sensor 83. Hereinafter, in order to distinguish between elements, the current sensor 62 is referred to as a first current sensor 62, and the current sensor 83 is referred to as a second current sensor 83.

The constant current source 82 is configured to be capable of being connected to the first connection terminal TC1 and the second connection terminal TC2 of the power source system 10 via a charge path L8. The constant current source 82 causes the charge current to flow to the storage battery 40 in response to the charge command transmitted from the charge control apparatus 81 to charge the storage battery 40. The second current sensor 83 is connected in series to the constant current source 82 on the charge path L8 and detects the charge current. According to the present embodiment, as the second current sensor 83, a current sensor having an accuracy higher than that of the first current sensor 62 of the power source system 10 is utilized.

The charge control apparatus 81 is provided with a known microcomputer including CPU, ROM, RAM, flash memory and the like. The charge control apparatus 81 operates with power supplied by the constant current source 82, reads an arithmetic program stored in the ROM and control data, thereby achieving various functions to charge the storage battery. Specifically, the charge control apparatus 81 outputs a charge command to the constant current source 82, and commands the control apparatus 60 of the power source system 10 to activate charging via a communication unit 84. Once the control apparatus 60 receives the above command via the communication unit 68, the control apparatus 60 sets the first and second switches SW1 and SW2 to be opened and sets the third and fourth switches SW3 and SW4 to be closed.

Moreover, the charge control apparatus 81 achieves various functions to mange the storage battery 40. Specifically, the charge control unit 81 commands the control apparatus 60 to calculate the error ΔZ during the charging period of the charger 80. Once receiving the above command, the control apparatus 60 transmits the command signal to the current modulation circuit 50 to generate the variation current Im and the variation voltage Vs based on the charge current. The control apparatus 60 acquires the imaginary part component of the variation current Im using the first current sensor 62, and acquires the real part and the imaginary part of the variation voltage Vs using the voltage sensor 61. The control apparatus 60 transmits acquired these values to the charge control apparatus 81.

The charge control apparatus 81 acquires the imaginary part of the variation current Im and the real part and the imaginary part of the variation voltage Vs from the control apparatus 60.

Further, the charge control apparatus 81 uses the second current sensor 83 to acquire the real part of the variation current Im. Note that, with a synchronization process between the control apparatus 60 and the charge control apparatus 81 via the communication units 68 and 84, the first current sensor 62, the voltage sensor 61 and the second current sensor 83 are synchronized to acquire the variation voltage Vs and the variation current Im. The charge control apparatus 81 calculates the error ΔZ using these values and corrects the impedance Z using the calculated error ΔZ. The impedance Z used for the correction may be calculated during the charging period of the storage battery 40 and a period different from the calculation period of the error ΔZ. Alternatively, the impedance Z used for the correction may be the one measured by the control apparatus 60 before the charging period of the storage battery 40 and stored into the memory unit 66.

Then, the charge control apparatus 81 transmits the battery information JD to the management server 90 via the communication unit 84. The battery information JD includes, other than the error ΔZ and the impedance Z after correction, identification information JS to identify the storage battery 40 with which the above values are calculated and information to identify the time. As the identification information JS, other than the manufacturing number of the storage battery, the vehicle number (vehicle registration number) of the vehicle on which the power source system 10 is mounted can be used.

The management server 90 is configured as a data server for example, and stores battery information JD transmitted from the charge control apparatus 81. The management server 90 uses identification information JS included in the battery information JD and stores the battery information JD in association with the identification information JS. Hence, even in the case where the battery information JD of the same storage battery 40 is transmitted from different charge control apparatus 81, the identification information JS is utilized to store these battery information JD in association with the identification information JS.

The data analyzing apparatus 91 analyzes the battery information JD which has been stored in the management server 90 via the communication unit 93. Specifically, the data analyzing apparatus 91 analyzes a change in the impedance Z after the correction for each storage battery 40, that is, each vehicle, thereby analyzing a degree of deterioration and a rate of deterioration of the storage battery 40. Thus, a deterioration rate of the storage battery 40 varies between vehicle types can be detected, for example.

Also, the charge control apparatus 81 transmits the charge information JE to the user interface 92 via the communication unit 84. The user interface 92 is a portable terminal of the vehicle owner, for example, a smartphone or a tablet terminal. Also, the charge information JE includes SOC (state of charge) indicating a state of storage of the storage battery 40, a charging time required for charging the storage battery 40 and a maximum power capable of charging the storage battery. This information is calculated by the charge control apparatus 81 based on the calculated impedance Z after the correction.

The vehicle owner confirms the charge information JE via the user interface 92 and recognizes the degree of deterioration of the storage battery 40 based on the maximum power capable of charging the storage battery 40, for example. Further, the vehicle owner confirms the charging time of the storage battery 40, and when the charging is not sufficient with the current charging rate, the vehicle owner commands the charge control apparatus 81 to increase the charge current. Moreover, when recognized that the charging will not be completed on time, the vehicle owner commands the charge control apparatus 81 to stop the charging in the middle. Thus, the charge control apparatus 81 flexibly responds to a change request of the vehicle owner.

According to the above embodiment described in detail, the following effects and advantages can be obtained.

According to the present embodiment, since the charge control apparatus 81 of the charger 80 calculates the error ΔZ, for a plurality of storage batteries 40 included in a plurality of power source systems 10, a common charge control apparatus 81 included in the charger 80 is utilized to calculate the error ΔZ, thereby calculating the impedance Z.

According to the present embodiment, the management server 90 stores the battery information JD including the impedance Z after the correction in association with the identification information JS. Hence, even in a case where the storage battery 40 is charged by different charger 80, the management server 90 makes the battery information JD transmitted from these chargers 80 in association with the identification information JS. Thus, in the management server 90, the battery information JD corresponding to the same storage battery 40 can be collectively managed.

According to the present embodiment, the error ΔZ is calculated during the charging period where the storage battery 40 is charged by the charger 80. Since the error ΔZ is calculated during the charging period, although required period for calculating the error ΔZ is longer, the error ΔZ can be appropriately calculated. Hence, a chance for calculating the error ΔZ can be reliably secured.

For the on-vehicle first current sensor 62, the current measurement range thereof has to be wider in order to detect the current flowing from/to the storage battery while the vehicle is travelling. However, it is difficult to increase the detection accuracy through the whole measurement range. According to the present embodiment, as the second current sensor 83 provided in the charger 80, a current sensor of which the accuracy is higher than that of the first current sensor 62 is utilized. Therefore, the second current sensor 83 is used to acquire the real part component of the variation current Im, thereby accurately calculating the error ΔZ.

(Modification of Fifth Embodiment)

Instead of using the current modulation circuit 50, the constant current source 82 of the charger may be used to output a predetermined AC signal to the storage battery 40. In this case, the current modulation circuit may not be provided. Further, the constant current source 82 may apply, based on a charge command transmitted from the charge control apparatus 81, a constant voltage to the storage battery 40.

Other Embodiments

The above-described respective embodiments may be modified in the following manners.

The storage battery 40 is not limited to the lithium ion storage battery, but may be a lead storage battery or a nickel hydrogen storage battery.

Figure 13:
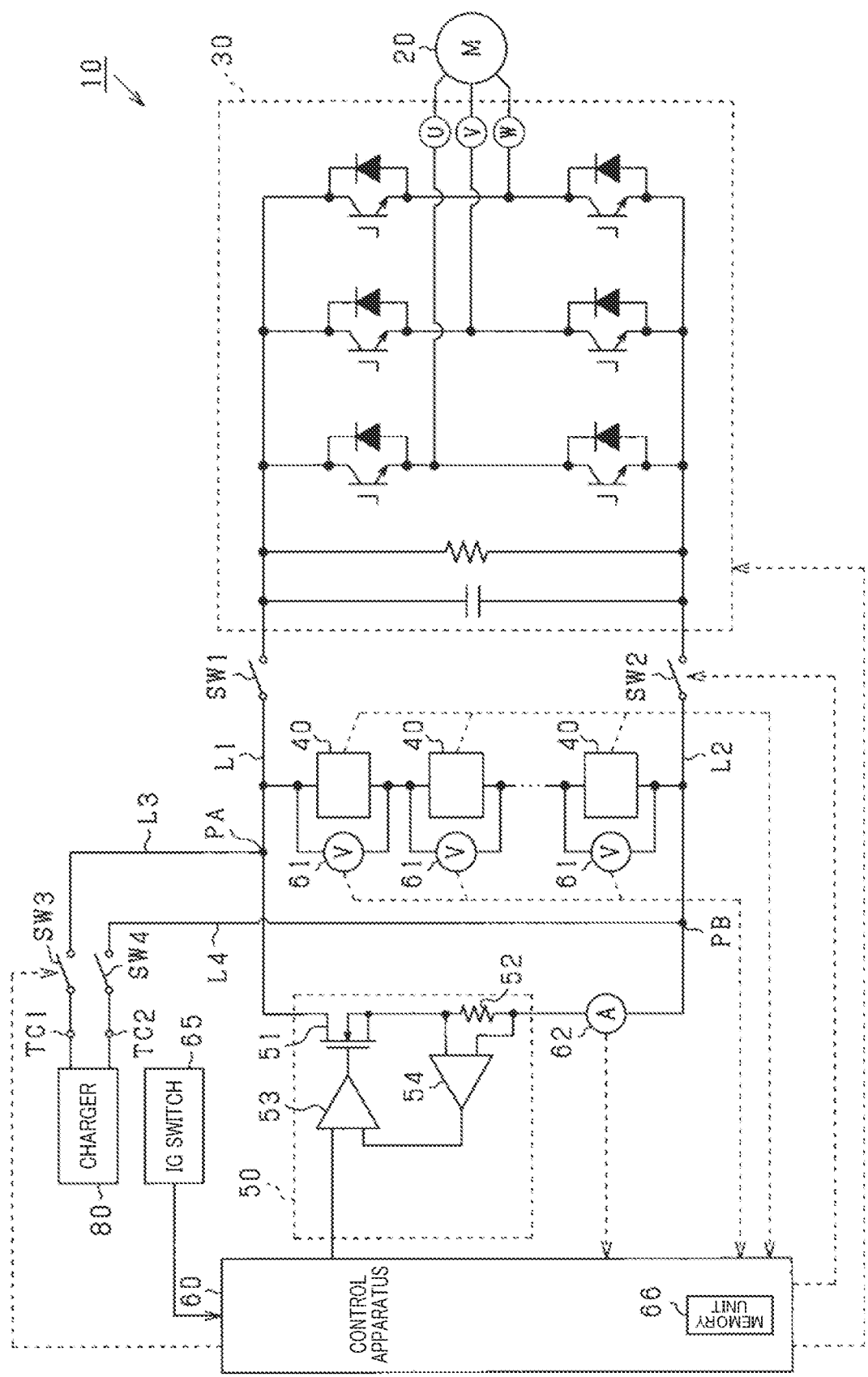
FIG. 13 is a diagram showing a battery management system according to other embodiments.
Figure 14:
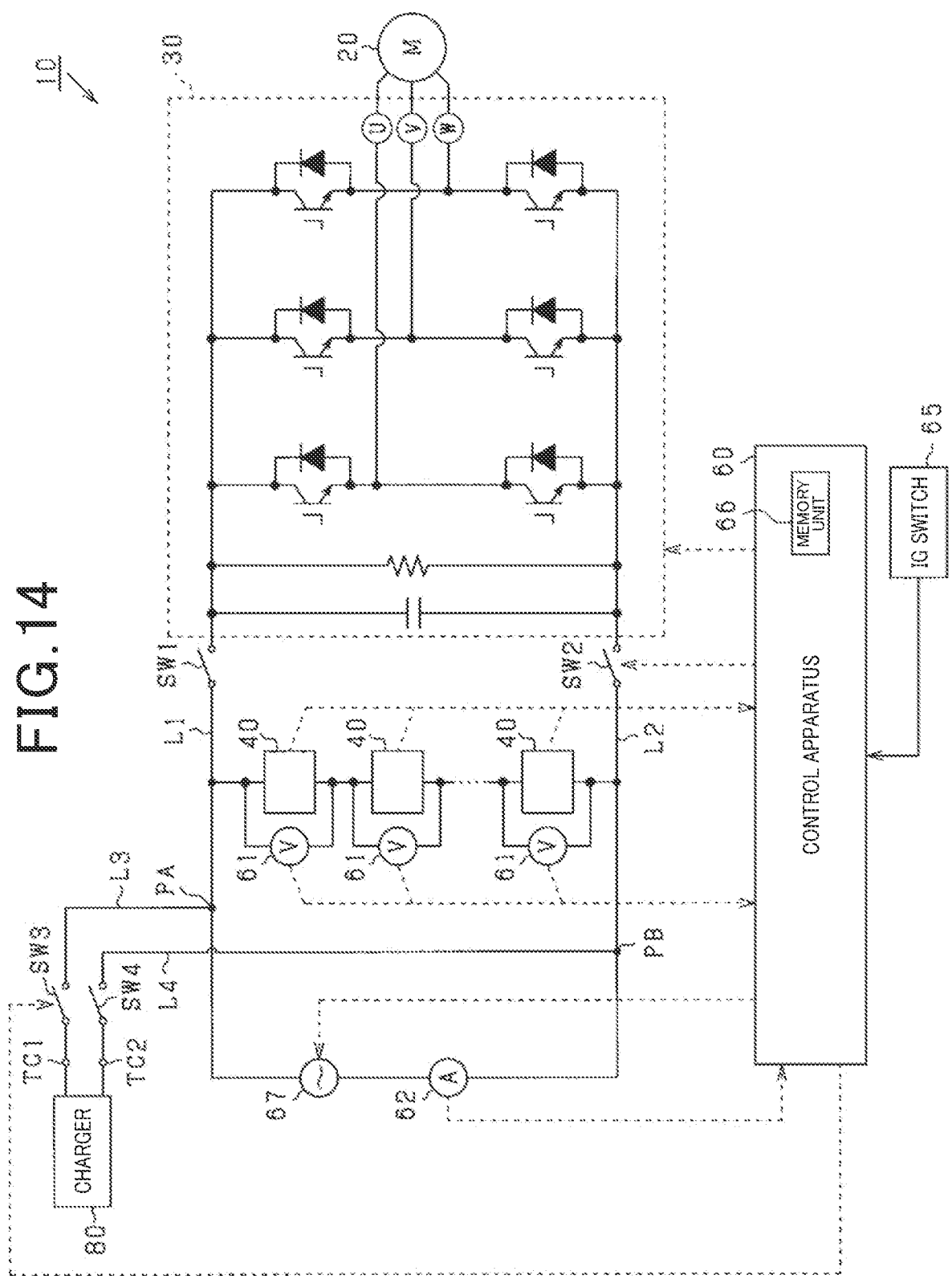
FIG. 14 is a diagram showing a battery management system according to other embodiments.

In the above-described respective embodiments, a case was exemplified in which the storage battery 40 is configured as a battery cell assembly 41. However, the storage battery 40 may be configured as a single battery cell. Further, as shown in FIG. 13, a plurality of storage batteries may be connected in series. In this case, the voltage sensor 61 is provided for each storage battery 40 and detects a variation voltage Vs of corresponding storage battery 40. The control apparatus 60 acquires the variation voltage Vs from the respective voltage sensor 61. Further, the control apparatus 60 acquires the battery voltage TB and the battery pressure PR from the temperature sensor 63 and the pressure sensor 64 in the respective storage voltage 40 and calculates the impedance Z of the respective storage batteries 40. As shown in FIG. 14, the same applied to a case where power is inputted to the storage battery 40 to cause the storage battery 40 to output the predetermined AC signal. Thus, not only for the error ΔZ of each storage battery 40, but also total error ΔZ of a plurality of storage batteries 40 can be acquire.

Figure 15:
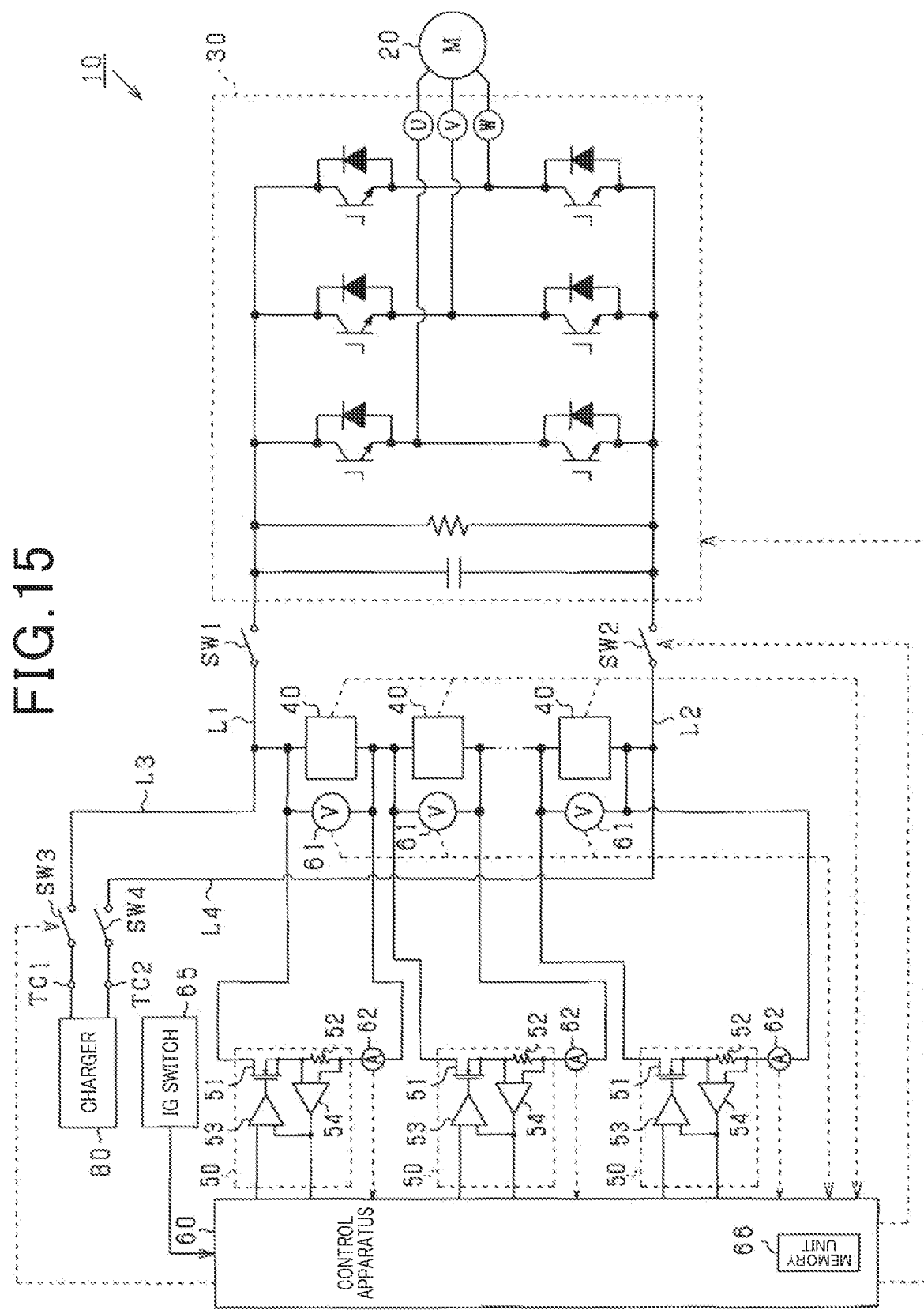
FIG. 15 is a diagram showing a battery management system according to other embodiments.

Further, in the power source system 10 including the current modulation circuit 50 and the current sensor 62, as shown in FIG. 15, the current modulation circuit 50 and the current sensor 62 may be provided for each storage battery 40. The current modulation circuit 50 applied the AC signal having the first specific frequency Ftg1 to the storage battery 40. At least either the current modulation circuit 50 or the current sensor 62 detects variation current Im of corresponding storage battery 40. The control apparatus 60 acquires the variation current Im from at least either the current modulation circuit 50 or the current sensor 62 and calculates the impedance Z of the respective storage battery 40.

The specified frequency is not limited to the first specific frequency Ftg1, that is, ohmic frequency, but may be a frequency γ at which the at least either the real part component ZR or the imaginary part of the impedance Z is a specific value. In this case, the error ΔZ may occur at not only the imaginary part component ZI but the real part component ZR. In the case where the error ΔZ occurs at both the imaginary part component ZI and the real part component ZR, simultaneous equations of an equation corresponding to an error of the imaginary part ZI and an equation corresponding to an error of the real part component ZR is used, whereby the error parameter Σm and the frequency γ can be obtained.

According to the above-described first embodiment, a case was exemplified in which the impedance calculation period TI is both a period of vehicle traveling and a period of vehicle being stopped other than the error calculation period TG. However, it is not limited thereto and only the period of vehicle being stopped may be the impedance calculation period TI. Thus, the impedance Z can be calculated under a state where the first and second switches SW1 and SW2 are in a closed state. Hence, the impedance Z of the storage battery 40 can be accurately calculated with a low noise environment.

According to the above-described first embodiment, the error calculation period TG is defined as a charging period of the storage battery 40 by the charger 80. However, it is not limited thereto. For example, the error calculation period TG may be a predetermined test period at the time of factory shipment of the storage battery 40.

Further, the error calculation period TG may be a predetermined test period in the vehicle maintenance of a vehicle on which the storage battery 40 is mounted. In the error calculation period TG, an external power source applies an AC signal having the first specific frequency Ftg1 to the storage battery 40 before being mounted on the vehicle or the storage battery 40 being mounted on the vehicle, thereby calculating the error ΔZ.

Further, a period where the IG switch is being in the open state may be defined as an error calculation period TG and a period where the IG switch 65 is being in the closed state may be defined as the impedance calculation period TI. Moreover, the stop period of the inverter 30 may be defined as the error calculation period TG and the operation period of the inverter 30 may be defined as the impedance calculation period TI.

According to the above-described first embodiment, the first specific frequency Ftg1 which is an ohmic frequency is exemplified as the specified frequency, but it is not limited thereto. The specified frequency may be set to be a frequency at which the imaginary part component ZI of the specific impedance ZB of the storage battery 40 is specified value. In this case, the error ΔZ can be calculated using the imaginary part component ZI of the impedance Z, the imaginary part component ZI of the specific impedance ZB and an equation for correction.

According to the above-described first embodiment, as the battery parameter, the battery temperature TB, the battery pressure PR and the SOC are exemplified. However, it is not limited thereto. At least one of battery parameters of the battery temperature TB, the battery pressure PR and the SOC may be acquired.

In the above-described embodiments, a case was exemplified in which one storage battery is provided in the power source system 10. However, this is not limited thereto. A plurality of storage batteries 40 which are connected in series or parallel may be utilized.

In the above-described embodiments, a case was exemplified in which the error ΔZ is calculated by the control apparatus 60 of the power source system 10 and the charge control apparatus 81 of the charger 80. However, it is not limited thereto. The error ΔZ may be calculated by a dedicated apparatus for calculating the error ΔZ.

The control unit and method thereof disclosed in the present disclosure may be accomplished by a dedicated computer constituted of a processor and a memory programmed to execute one or more functions embodied by computer programs. Alternatively, the control unit and method thereof disclosed in the present disclosure may be accomplished by a dedicated computer provided by a processor configured of one or more dedicated hardware logic circuits. Further, the control unit and method thereof disclosed in the present disclosure may be accomplished by one or more dedicated computer where a processor and a memory programmed to execute one or more functions, and a processor configured of one or more hardware logic circuits are combined. Furthermore, the computer programs may be stored, as instruction codes to be executed by the computer, into a computer readable non-transitory tangible recording media.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

Conclusion

The present disclosure has been achieved in light of the above-described circumstances and provides an impedance calculation apparatus capable of accurately calculating an impedance of a storage battery.

A first means of the present disclosure is an impedance calculation apparatus applicable to a power source system provided with a storage battery, applying an AC signal to the storage battery to calculate an impedance of the storage battery, during a predetermined impedance calculation period, the impedance calculation apparatus including: an error calculation unit that applies the AC signal having a specified frequency at which at least either a real part component or an imaginary part component of an impedance of the storage battery is a specific value, to calculate an impedance error of the storage battery, during an error calculation period different from the impedance calculation period; an impedance calculation unit that calculates an impedance of the storage battery during the impedance calculation period; and a correction unit that corrects, based on the impedance error, the impedance of the storage battery calculated by the impedance calculation unit.

According to the impedance calculation apparatus that calculates an impedance of a storage battery, a process for calculating the impedance of the storage battery is performed by applying an AC signal to the storage battery. In this case, when an induced electromotive force is generated due to magnetic flux with a current flowing through the conduction path with which the AC signal is applied to the storage battery, the calculation accuracy of the impedance is lowered.

In this respect, according to the above-described configuration, the storage battery is applied with an AC signal having a specified frequency at which at least either a real part component or an imaginary part component of an impedance of the storage battery is a specific value, thereby calculating the impedance error. In other words, as long as a difference is present between at least either the real part component or an imaginary part component of the impedance calculated by applying the AC signal having the specified frequency and the specific value, the impedance error due to the induced electromotive force can be calculated using the difference. Then, when calculating the impedance of the storage battery during the impedance calculation period different from the error calculation period, the impedance of the storage battery is corrected based on this impedance error. Thus, influence due to the induced electromotive force is suppressed and the impedance of the storage battery can be accurately calculated.

As a second means, the specified frequency is an ohmic frequency with which an ohmic resistance of the storage battery is calculated; the error calculation unit calculates an error parameter as the impedance error, the error parameter being a value where an imaginary part component of the impedance of the storage battery calculated by applying the AC signal having the ohmic frequency is divided by a specific angular frequency corresponding to the specified frequency; the correction unit corrects, based on the error parameter, the impedance of the storage battery calculated by the impedance calculation unit.

When the induced electromotive force that influences the voltage variation circuit including the storage battery to produce more than specified error does not occur, the real part component of the impedance calculated by applying the AC signal having the ohmic frequency is ohmic resistance and the imaginary part component is 0. According to the above-described configuration, when calculating the impedance error, the AC signal having the ohmic frequency is applied to the storage battery. Hence, when the imaginary part component of the calculated impedance is not 0, the error parameter can be calculated using the imaginary part component.

As a third means, a parameter acquiring unit is provided to acquire at least one of battery parameters including a temperature, a SOC and a pressure of the storage battery. The error calculation unit sets the specified frequency based on the battery parameter acquired by the parameter acquiring unit, and applies the AC signal having the specified frequency set by the error calculation unit, to calculate the impedance error.

The specified frequency varies depending on the battery temperature, the SOC and the battery pressure. According to the above-described configuration, at least one of the battery temperature, the SOC and the battery pressure is acquired, the AC signal having the specified frequency corresponding to the battery pressure is applied to calculated the impedance error of the storage battery. Hence, suppressing an influence due to the variations of the battery temperature, the SOC, and the battery pressure, the impedance of the storage battery can be accurately calculated.

As a fourth means, the storage battery exchanges power with a rotary electric machine via an inverter; a load side switch is provided to open or close a conduction path between the inverter and the storage battery; the error calculation unit calculates the impedance error during an open period of the load side switch.

The impedance error is affected by current flowing through the inverter with a smoothing capacitor that constitutes the inverter and stray capacitances of the switches that constitute the inverter. Hence, when the impedance error is calculated during the conduction period of the inverter, the accuracy of calculating the impedance error is lowered. In this respect, according to the above-described configuration, the impedance error is calculated during the open period of the load side switch provided between the inverter and the storage battery. Thus, an influence of the current flowing through the inverter is suppressed and the impedance error due to the induced electromotive force caused by the AC signal for calculating the impedance can be calculated. As a result, the impedance of the storage battery can be accurately calculated.

As a fifth means, the impedance calculation unit calculates the impedance of the storage battery during the open period of the load side switch.

Similar to the impedance error, the impedance is influenced by a current flowing through the inverter. In this respect, according to the above-described configuration, the impedance of the storage battery is calculated during the open period of the load side switch. Thus, an influence by the current flowing through the inverter is suppressed and the impedance of the storage battery can be accurately calculated.

As a sixth means, the storage battery exchanges power with a rotary electric machine via an inverter; a load side switch is provided to open or close a conduction path between the inverter and the storage battery; the error calculation unit calculates the impedance error using a charge-discharge current flowing between the storage battery and the rotary electric machine during a closed period of the load side switch.

A storage battery that exchanges power with a rotary electric machine via an inverter is present. According to the above-described configuration, the impedance error is calculated in the closed period of the load side switch provided between the inverter and the storage battery. Thus, the charge-discharge current of the storage battery flowing between the storage battery and the rotary electric machine is utilized to calculate the impedance error.

As the seventh means, the impedance calculation unit calculates the impedance of the storage battery during the closed period of the load side switch.

The impedance is influenced by the current flowing through the inverter. When the influence from the current is different from that of the case when calculating the impedance error, an accuracy for correcting the impedance with the impedance error is lowered. In this respect, according to the above-described configuration, similar to the case of calculating the impedance error, the impedance of the storage battery is calculated during the closed period of the load side switch. Thus, an influence by the current flowing through the inverter is suppressed and the impedance of the storage battery can be accurately calculated. Also, according to the above-described configuration, the impedance can be calculated while the storage battery is being charged or discharged.

As a eighth means, the storage battery exchanges power with a rotary electric machine via an inverter and is configured to be capable of being charged by a charger outside the power source system; a load side switch is provided to open or close a conduction path between the inverter and the storage battery and a charger side switch is provided to open or close a conduction path between a connection terminal to which the charger is connected and the storage battery; the error calculation unit calculates the impedance error using a charge-discharge current of the storage battery flowing from the charger to the storage battery during the open period of the load side switch and a closed period of the charger side switch.

The storage battery exchanges power with a rotary electric machine via an inverter and may be capable of being charged by a charger outside the power source system. According to the above-described configuration, the impedance error is calculated during the charging period of the storage battery by the charger. Thus, the charge current of the storage battery flowing from the charger to the storage battery is utilized, whereby the impedance error can be calculated. Further, since the charger side switches are closed and the load side switches are opened during the charging period of the storage battery by the charger, the impedance error can be calculated while suppressing an influence due to the current flowing through the inverter such as an influence from a smoothing capacitor that constitutes the inverter and stray capacitances of the switches that constitute the inverter.

As a ninth means, the impedance calculation unit calculates the impedance of the storage battery during the open period of the load side switch and the closed period of the charger side switch.

The impedance is influenced by the current flowing through the inverter. According to the above-described configuration, the impedance of the storage battery is calculated during the open period of the load side switches and the closed period of the charger side switches. Thus, the charge current of the storage battery flowing from the charger to the storage battery is utilized to calculate the impedance, and the impedance can be calculated while suppressing an influence due to noise or the like caused by the charge current leaking towards the inverter side.

As the tenth means, a battery management system is provided including the above-described impedance calculation apparatus; a charger that charges the storage battery; and an external apparatus. The impedance calculation apparatus is provided with a communication unit that receives and transmits battery information with the external apparatus, the battery information including the impedance of the storage battery which is corrected by the correction unit; and the external apparatus stores the battery information in association with identification information that identifies the storage battery.

According to the above-described configuration, since the charger includes the impedance calculation apparatus, a common impedance calculation apparatus included in the charger is used, whereby the impedance can be corrected for a plurality of storage batteries included in a plurality of power source system. Further, according to the above-described configuration, an external apparatus is configured to store the battery information including the impedance after the correction in association with the identification information of the storage battery. Therefore, even when some storage batteries are charged by different chargers, the battery information transmitted from these chargers are mutually associated with the identification information. Thus, in the external apparatus, the battery information for the same storage battery can be collectively managed.

What is claimed is:

1. An impedance calculation apparatus applicable to a power source system provided with a storage battery, applying an AC signal to the storage battery to calculate an impedance of the storage battery, during a predetermined impedance calculation period, the impedance calculation apparatus comprising:
    an error calculation unit that applies the AC signal having a specified frequency at which at least either a real part component or an imaginary part component of an impedance of the storage battery is a specific value, to calculate an impedance error of the storage battery, during an error calculation period different from the impedance calculation period;
    an impedance calculation unit that calculates an impedance of the storage battery during the impedance calculation period; and
    a correction unit that corrects, based on the impedance error, the impedance of the storage battery calculated by the impedance calculation unit.

2. The impedance calculation apparatus according to claim 1, wherein
    the specified frequency is an ohmic frequency with which an ohmic resistance of the storage battery is calculated;
    the error calculation unit calculates an error parameter $\Sigma m$ as the impedance error, the error parameter being a value where an imaginary part component of the impedance of the storage battery calculated by applying the AC signal having the ohmic frequency is divided by a specific angular frequency corresponding to the specified frequency; and
    the correction unit corrects, based on the error parameter, the impedance of the storage battery calculated by the impedance calculation unit.

3. The impedance calculation apparatus according to claim 1 further comprising a parameter acquiring unit that acquires at least one of battery parameters including a temperature, a SOC and a pressure of the storage battery, wherein
    the error calculation unit sets the specified frequency based on the battery parameter acquired by the parameter acquiring unit, and applies the AC signal having the specified frequency set by the error calculation unit, to calculate the impedance error.

4. The impedance calculation apparatus according to claim 1, wherein
    the storage battery exchanges power with a rotary electric machine via an inverter;
    a load side switch is provided to open or close a conduction path between the inverter and the storage battery; and
    the error calculation unit calculates the impedance error during an open period of the load side switch.

5. The impedance calculation apparatus according to claim 4, wherein
    the impedance calculation unit calculates the impedance of the storage battery during the open period of the load side switch.

6. The impedance calculation apparatus according to claim 1, wherein
    the storage battery exchanges power with a rotary electric machine via an inverter;
    a load side switch is provided to open or close a conduction path between the inverter and the storage battery; and
    the error calculation unit calculates the impedance error using a charge-discharge current flowing between the storage battery and the rotary electric machine during a closed period of the load side switch.

7. The impedance calculation apparatus according to claim 6, wherein
the impedance calculation unit calculates the impedance of the storage battery during the closed period of the load side switch.

8. The impedance calculation apparatus according to claim 1, wherein
the storage battery exchanges power with a rotary electric machine via an inverter and is configured to be capable of being charged by a charger outside the power source system;
a load side switch is provided to open or close a conduction path between the inverter and the storage battery and a charger side switch is provided to open or close a conduction path between a connection terminal to which the charger is connected and the storage battery; and
the error calculation unit calculates the impedance error using a charge-discharge current of the storage battery flowing from the charger to the storage battery during the open period of the load side switch and a closed period of the charger side switch.

9. The impedance calculation apparatus according to claim 8, wherein
the impedance calculation unit calculates the impedance of the storage battery during the open period of the load side switch and the closed period of the charger side switch.

10. The impedance calculation apparatus according to claim 1, wherein
the error calculation unit controls an AC signal application circuit to apply the AC signal to the storage battery.

11. The impedance calculation apparatus according to claim 10, wherein
the AC signal application circuit includes a switching element and an amplifier.

12. A battery management system comprising:
an impedance calculation apparatus applicable to a power source system provided with a storage battery, applying an AC signal to the storage battery to calculate an impedance of the storage battery, during a predetermined impedance calculation period, the impedance calculation apparatus comprising:
an error calculation unit that applies the AC signal having a specified frequency at which at least either a real part component or an imaginary part component of an impedance of the storage battery is a specific value, to calculate an impedance error of the storage battery, during an error calculation period different from the impedance calculation period,
an impedance calculation unit that calculates an impedance of the storage battery during the impedance calculation period, and
a correction unit that corrects, based on the impedance error, the impedance of the storage battery calculated by the impedance calculation unit;
a charger that charges the storage battery; and
an external apparatus,
wherein
the impedance calculation apparatus is provided with a communication unit that receives and transmits battery information with the external apparatus, the battery information including the impedance of the storage battery which is corrected by the correction unit; and
the external apparatus stores the battery information in association with identification information that identifies the storage battery.

13. The battery management system according to claim 12, wherein
the error calculation unit controls an AC signal application circuit to apply the AC signal to the storage battery.

14. The battery management system according to claim 13, wherein
the AC signal application circuit includes a switching element and an amplifier.

* * * * *